(12) United States Patent
McCoy

(10) Patent No.: US 10,060,247 B2
(45) Date of Patent: Aug. 28, 2018

(54) HYDROCARBON WELL PERFORMANCE MONITORING SYSTEM

(71) Applicant: James N. McCoy, Wichita Falls, TX (US)

(72) Inventor: James N. McCoy, Wichita Falls, TX (US)

(*) Notice: Subject to any disclaimer, the term of this patent is extended or adjusted under 35 U.S.C. 154(b) by 0 days.

(21) Appl. No.: 15/422,576

(22) Filed: Feb. 2, 2017

(65) Prior Publication Data

US 2017/0159422 A1    Jun. 8, 2017

Related U.S. Application Data

(63) Continuation of application No. 14/560,024, filed on Dec. 4, 2014, now Pat. No. 9,587,481.

(51) Int. Cl.
| | | |
|---|---|---|
| *E21B 41/00* | (2006.01) | |
| *E21B 47/00* | (2012.01) | |
| *E21B 43/12* | (2006.01) | |
| *E21B 47/04* | (2012.01) | |
| *E21B 47/06* | (2012.01) | |
| *E21B 49/00* | (2006.01) | |
| *E21B 49/08* | (2006.01) | |
| *E21B 47/12* | (2012.01) | |
| *G01L 5/00* | (2006.01) | |
| *G01P 7/00* | (2006.01) | |
| *G01P 15/00* | (2006.01) | |

(52) U.S. Cl.
CPC ...... *E21B 47/0008* (2013.01); *E21B 41/0092* (2013.01); *E21B 43/121* (2013.01); *E21B 43/126* (2013.01); *E21B 47/0007* (2013.01); *E21B 47/042* (2013.01); *E21B 47/06* (2013.01); *E21B 47/122* (2013.01); *E21B 49/00* (2013.01); *E21B 49/003* (2013.01); *E21B 49/08* (2013.01); *G01L 5/0061* (2013.01); *G01P 7/00* (2013.01); *G01P 15/00* (2013.01); *E21B 47/12* (2013.01); *E21B 2043/125* (2013.01)

(58) Field of Classification Search
CPC .. E21B 41/0092; E21B 43/121; E21B 43/125; E21B 43/126; E21B 47/0007; E21B 47/0008; E21B 47/042; E21B 47/06; E21B 47/122
See application file for complete search history.

(56) References Cited

U.S. PATENT DOCUMENTS

| | | | | |
|---|---|---|---|---|
| 5,406,482 | A * | 4/1995 | McCoy | E21B 43/127 417/63 |
| 9,574,435 | B2 * | 2/2017 | McCoy | E21B 47/0007 |

* cited by examiner

*Primary Examiner* — Bryan Bui
(74) *Attorney, Agent, or Firm* — Dan Brown Law Office; Daniel R. Brown

(57) ABSTRACT

A system and method for real-time data acquisition and presentation of force, position, load, pressures, and movement within a subterranean well pumping system, such as an oil well. Data is gathered using sensors attached to a surface level pump drive and wellhead system. Well structural data and well production data are combined therewith to generate a real-time display of down-hole well operation, including animated graphics of the pump operation, including pump movement, rod and tubing stretch, fluid movement, gas compression, system forces, and fluid pressures. Liquid levels are tested using an acoustic liquid level instrument, and incorporated to improve well performance analysis.

29 Claims, 20 Drawing Sheets

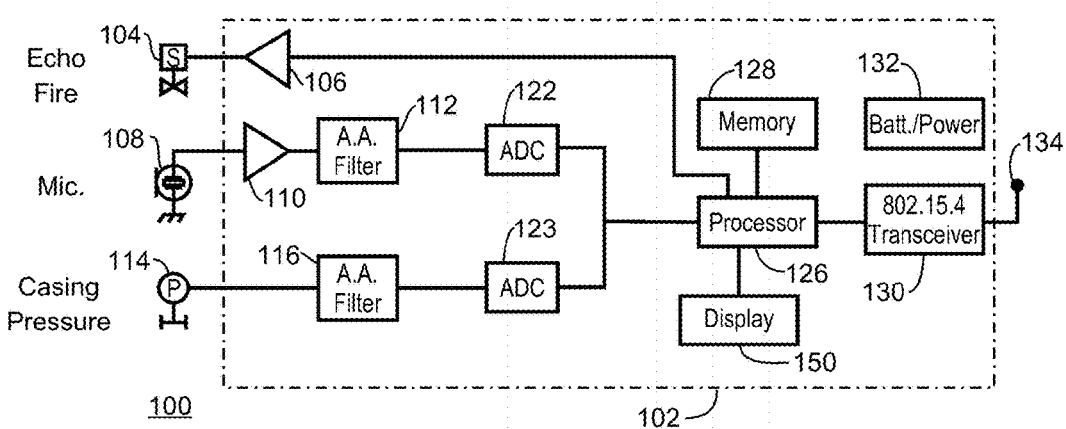
Fig. 8
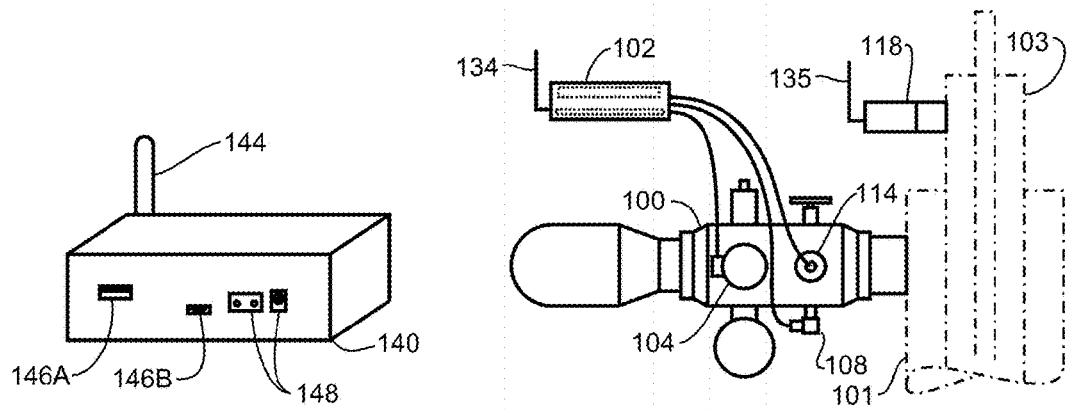
Fig. 9
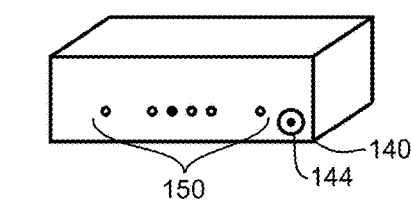
Fig. 12
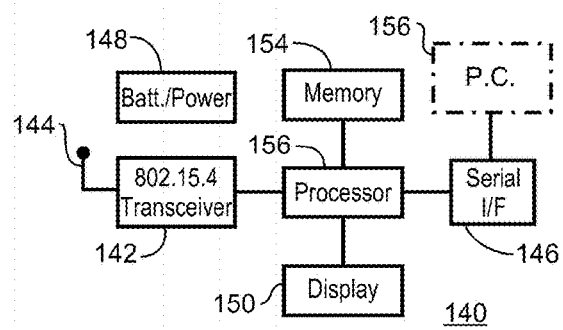
Fig. 11
Fig. 10

Main Card Screen

Pump Analysis View

Fig. 22

Replay Screen

Liquid Level Main View

HYDROCARBON WELL PERFORMANCE MONITORING SYSTEM

RELATED APPLICATION

This is a Continuation application from U.S. application Ser. No. 14/560,024 filed on Dec. 14, 2014, which is a Divisional application from U.S. application Ser. No. 13/334,385 filed on Dec. 22, 2011.

BACKGROUND OF THE INVENTION

Field of the Invention

The present invention relates to monitoring the operation and performance of sucker rod pumped wells. More particularly, the present invention relates to systems that employ dynamometers, acoustic level measuring devices, and pressure sensors in conjunction with a computer to monitor in real-time, record, and display a wide range of information about various operational parameters in oil and gas wells that employ a sucker rod pump.

Description of the Related Art

Most wells utilize a pumping system to extract oil, gas, and water from subterranean well boreholes. The pumping system typically comprises a surface mounted reciprocating drive unit coupled to a submerged pump by a long steel rod, referred to as a sucker-rod. The submerged pump consists of a chamber, plunger, and a pair of check valves arranged to draw fluids into the chamber and lift fluids to the surface on each upstroke of the plunger. Since wells range in depths to many thousand feet, the forces and pressures involved in the pumping operation are substantial. The costs of drilling, assembling, and servicing such wells are also substantial. Costs are only offset by efficient production of oil and gas products from the well. Thus, the careful attention given by operators to efficient and reliable operation of sucker-rod pumped wells over many decades of experience can be readily appreciated. Well operators can directly access and monitor surface mounted well equipment performance. One technique is the use of a dynamometer that determines the position and forces on the sucker-rod at the surface level. Wells employ a wellhead assembly to seal the well fluids within a surface plumbing system. The reciprocating rod enters the wellhead assembly through a sliding seal, which requires that the rod be terminated at the surface level by a polished portion, commonly referred to as a polished rod. The surface dynamometer output has traditionally been a dynagraph that provides a two dimensional plot of force versus position of the polished rod, generally referred to as a "surface card". However, many of the critical pumping components are installed deep into the well's borehole, referred to as "down-hole", where direct monitoring is not economically practical. Since failure of a system component down-hole can have catastrophic implications both in terms of repair costs and lost production, well operators have long sought equipment and techniques for assessing down-hole operation and performance. Experienced operators can, to a limited degree, extrapolate from trends in surface card plots over time to infer potential problems occurring down-hole, although this approach remains substantially subjective.

An important advancement in the area of down-hole performance analysis was contributed by S. G. Gibbs when he deduced that down-hole forces and movements could be accurately estimated based on structural information about the well equipment and surface forces and movement of the polished rod. Essentially, Gibbs modeled the sucker rod as a transmission line using a viscous damped wave equation in the form of boundary conditions to a set of differential equations. Gibbs' teachings were initially presented in U.S. Pat. No. 3,343,409 to Gibbs, issued Sep. 26, 1967, for METHOD OF DETERMINING SUCKER ROD PUMP PERFORMANCE, which was directed to a process for determining the down-hole performance of a pumping oil well by measuring data at the surface. The size, length and weight of the sucker rod string are determined and the load and displacement of the polished rod as a function of time are recorded. From that data it is possible to construct a load versus displacement curve for the sucker rod string at any selected depth in the well. Thus, Gibbs presents a technique for generating a pump level dynagraph, referred to as a "pump card", according to surface measurements.

Further advancements in equipment and techniques for gathering and processing surface data and generating down-hole data have been contributed by McCoy et al., and are presented in a series of patents. The use of an accelerometer and strain gauge in a polished rod transducer to implement a surface dynamometer have been taught. The accelerometer advancements are presented in U.S. Pat. No. 5,406,482 to McCoy et al., issued Apr. 11, 1995, for METHOD AND APPARATUS FOR MEASURING PUMPING ROD POSITION AND OTHER ASPECTS OF A PUMPING SYSTEM BY USE OF AN ACCELEROMETER, which teaches that an accelerometer is mounted on the pumping system unit to move in conjunction with the polished rod. An output signal from the accelerometer is digitized and provided to a portable computer. The computer processes the digitized accelerometer signal to integrate it to first produce a velocity data set and second produce a position data set. Operations are carried out to process the signal and produce a position trace with stroke markers to indicate positions of the rod during its cyclical operation.

The McCoy et al. advancements in the use of a strain gauge in a surface dynamometer are presented in U.S. Pat. No. 5,464,058 to McCoy et al, issued Nov. 7, 1995, for METHOD OF USING A POLISHED ROD TRANSDUCER, which teaches that a transducer is attached to the polished rod to measure deformation, i.e., the change in diameter or circumference of the rod to determine change in rod loading. The transducer includes strain gauges, which produce output signals proportional to the change in the diameter or circumference of the rod, which occurs due to changes in load on the rod. The transducer may also include an accelerometer. The change in load on the polished rod over a pump cycle is used in conjunction with data produced by the accelerometer to calculate a down-hole pump card according to the teachings of in the prior art cited herein. The pump card showing change in pump load is adjusted to reflect absolute rod load by determining an appropriate offset. Various ways to determine the offset are available. Since the pump plunger load is zero on the down stroke when the upper check valve, called the traveling valve, is open, the value necessary to correct the calculated minimum pump value to a zero load condition may be used as the offset. The offset can also be estimated by either a calculation of the rod weight, a predetermined rod weight measurement or an estimated load value by the operator.

A typical well is produced by drilling a borehole and installing a well casing. A tubing string is lowered into the well casing, and the well fluids are pumped to the surface through the tubing string. Thus, there exists an annular space between the casing and the tubing. The well fluids are present in this space, and it is useful to know the liquid level of the well fluids to better understand well operations and to improve accuracy of certain measurements and calculations.

In this regard, McCoy et al. have also provided further advancements in the art of measuring well casing and tubing liquid levels. These teachings are presented in U.S. Pat. No. 5,117,399 to McCoy et al., issued May 26, 1992, for DATA PROCESSING AND DISPLAY FOR ECHO SOUNDING DATA, which is directed to an echo sounding system with a acoustic gun which is mounted to the wellhead of a borehole casing. The acoustic gun produces an acoustic pulse that is transmitted down the casing or tubing. The acoustic pulse produces reflections when it strikes the tubing collars and the surface of the fluid. A microphone detects the reflections to produce a return signal. This signal is digitized and stored. The digitized signal is processed to detect the rate of the collar reflections, downhole markers and other structures in the well, and the stored signal is narrowband filtered with a pass band filter centered at the rate of receipt of the collars. The data signal is further processed to determine the time of occurrence of the acoustic pulse and the liquid surface reflection. Each cycle of the narrowband filtered signal corresponds to one collar reflection. In this signal, each cycle is counted, and extrapolation used when necessary to produce a collar count extending from the surface to the liquid surface. This is multiplied by the average joint length to produce the depth to the liquid surface.

As will be appreciated upon review of the aforementioned prior art and discussion, the process of monitoring well performance involves a visit to the well site by a technician for the operator, connection of the test sensors to the well's surface equipment, operation of the well, gathering data, reviewing prior production information, processing the data, and then analyzing the results. This is a highly technical process, and it requires a high degree of skill and knowledge to study a surface card, pump card, and liquid level data to develop a sense of the down-hole function and the overall performance of the well and pumping system. These efforts are essentially directed to determining how the well is performing in terms of the volume of well fluids produced in view of the pumping system's capabilities, and also determining if there are any performance irregularities developing that suggest a reliability issue or potential catastrophic failure event.

A discrepancy in the volume of fluids being produced is generally identified by a mismatch between the volume increase in the local storage tank over time, and the theoretical displacement of the pump based on pumping speed, stroke length and plunger diameter, and other physical and performance factors. There can be a number of reasons for such a mismatch. The petroleum formation reservoir may be providing insufficient liquid to fill the pump. Or, there may be a mechanical failure of the rod string, tubing string, a valve leakage, plunger slippage, inadequate design, improper pump system operation, and so forth. All of these factors can lead to a reduction in the volumetric efficiency of the pumping system. Further, since the well produces raw well fluids that contain oil, gas, water and solid minerals, there may be interference with expected operation of the pump. The pump inlet may be clogged, the valves may be partially blocked or restricted in movement. There may be excess gas in the pump chamber, creating a gas-locked condition.

With regards to the question of performance irregularities and potential failure of the pumping system, this issue is always present in the operator's mind and more prominently when the mean time between failures for a certain well has been less than expected. Although the tools available to the operators for analysis of dynamometer records have improved over the decades, as was mentioned in the foregoing discussion, these tools generally still focus on providing numerical results that the operator must interpret to obtain the desired information. Furthermore, this type of subjective analysis requires significant experience and is confusing and inaccurate as far as establishing how the pump is actually operating and the cause of unusual results. A major difficulty is created by the dynamic loads that are dependent on pumping speed and cause oscillations of the surface loads that are not directly caused by pump operation.

It is noteworthy that the availability of battery powered laptop computers outfitted with integrated circuits for analog to digital conversion and advanced analysis software has been instrumental in providing the benefits of digital dynamometer analysis technology to well operators. McCoy et al. working in conjunction with Echometer Co. in Wichita Falls, Tex., provide such a system, referred to as Total Well Management ("TWM"), which embodies much of the aforementioned prior art teachings. In the TWM system, acquired data consists of digitized load and acceleration samples measured at the polished rod during an extended period of time to ensure that the operation of the pump has stabilized. This data is expected to be representative of the normal operation of the pump. Processing of the surface data to generate the corresponding pump dynamometer cards is undertaken after acquisition of several strokes has been completed. The surface cards and pump cards can then be studied to analyze system performance. Additional structural and performance information may be presented together with the surface and pump dynagraphs.

FIG. 1 is a computer display output from the prior art Echometer TWM analysis software, and this figure shows the results of detailed calculations for a specific pump stroke that gives an analysis of the pump operation and the loads experienced at the surface. Note that the information presented in FIG. 1 is not produced in real-time at the time that the dynamometer measurements are taken. Rather, raw data is taken during the test, and then is later processed to generate to output of the display in FIG. 1. Pump displacement in this example is computed at 119.5 bbl/day based on the current pumping speed of 8.411 strokes per minute. The effective plunger stroke is 54.2 inches that corresponds to 62.65% of the total plunger stroke of 86.5 inches. Since the surface stroke is 100 inches there are 13.5 inches of stroke loss due to rod and tubing stretch. The shape of the pump dynagraph (bottom curve trace in FIG. 1) indicates that the pump barrel is filled with a mixture of liquid and gas at an initial pressure of 130.1 psi. The gas is compressed during the down stroke to a pressure that exceeds the pump discharge pressure at which point the traveling valve opens as indicated by the vertical dashed line. The minimum pump load is calculated as a negative 470 lbs, which shows that the bottom rods are loaded in compression. The polished rod power is computed as 6.3 HP from the area enclosed by the surface dynamometer card while the power expended at the pump equals 4.8 HP. The energy losses correspond to frictional forces between rods and fluids and rods and tubing. Additional analysis of the rod loading (not shown in this figure but presented in a detailed performance report) indicates that the rod string is loaded to 52% of the allowable loading, the pumping unit beam is loaded to 50% of its capacity and the gearbox is operating at 55% of maximum torque rating, and the prime mover is not overloaded.

Even though the prior art TWM system provides a substantial amount of technical information on well performance, it still requires a high degree of experience to interpret and analyze the numerical and graphical information in order to arrive at reasonable conclusions as to whether the pumping system is operating as intended and at the desired rate in an efficient manner. It also provides an after-the-fact analysis of a previously run test operation before the data presented in FIG. 1 can be presented to the user. Thus, is can be appreciated that there is a need in the art for a system and method for use in the sucker-rod pumped oil and gas well industry that further assists operators in calculating, analyzing, and outputting data while the sucker rod pump is in use, and providing a real-time representation of the facility function both at surface level and down hole.

SUMMARY OF THE INVENTION

The need in the art is addressed by the methods of the present invention. The present invention teaches a method for real-time data acquisition and generation of a position and force surface card for a subterranean well pumping system. This method provides for real-time acquisition and presentation by a processor of performance data, which is associated with a pump lifting well fluids from a subterranean well to a surface level, the is pump reciprocated by a rod extending upward to a cyclical drive unit at the surface level, and where the rod includes a polished rod fixed thereto. The method consists of simultaneously obtaining, in real-time, a sequence of polished rod acceleration data samples and polished rod strain data samples, and then calculating, in real-time, a sequence of polished rod position data points corresponding to the polished rod acceleration data samples, and a sequence of polished rod load data points corresponding to the polished rod strain data samples. Then, delivering, in real-time, the sequence of polished rod position data points and the sequence of polished rod load data points, correspondingly, to a surface card data output.

In a specific embodiment, the forgoing method further includes the steps of displaying, in real-time, the sequence of polished rod position data points and the sequence of polished rod load data points, as a graphical format surface card. In a refinement to this embodiment, the method further includes the step of displaying a cursor, in real-time, on the graphical format surface card, indicating an instant corresponding pair of the sequence of polished rod position data points and the sequence of polished rod load data points.

In a specific embodiment, the forgoing method further includes the steps of segregating the sequence of polished rod position data points and the sequence of polished rod load data points into discrete data sets according to individual strokes of the cyclical drive unit. In a refinement to this embodiment, the method further includes delimiting the discrete data sets by identifying a position in a repetitive pattern in the sequence of polished rod position data samples, and saving the delimited discrete data sets in a memory according to individual strokes of the cyclical drive unit.

In a specific embodiment, the forgoing method further includes the steps of storing in a machine readable file, the sequence of polished rod position data points and the sequence of polished rod load data points. In a refinement to this embodiment, the method further includes recalling the machine readable file, and reproducing the data points recalled from the machine readable file in a graphical format.

The present invention also teaches a method for real-time generation of a position and force pump card for a subterranean well pumping system. The method provides for real-time utilization of performance data by a processor, which is associated with a pump lifting well fluids above a liquid level in a casing of a subterranean well through a tube to a surface level, the pump has a chamber with a fluid inlet located below the liquid level that is gated by a stationary valve, and has a plunger slidably engaged with the chamber, the plunger has a fluid outlet gated by a traveling valve that is coupled to deliver well fluids to the tube, the plunger is reciprocated to vary the displacement of the chamber by a rod extending upward to a cyclical drive unit at the surface level. The steps of the method include obtaining, in real time, a sequence of rod position data samples and rod load data samples corresponding to cyclical operation of the rod at the surface level, and calculating, in real time, a sequence of plunger position data points and plunger load data points corresponding to cyclical operation of the rod at the plunger location, and calculated according to the rod surface position data samples, the rod surface load data samples, and on a set of structural data for the subterranean well. Then, delivering, in real-time, the sequence of plunger position data points and the sequence of plunger rod load data points, correspondingly, to a pump card data output.

In a specific embodiment, the forgoing method further includes the steps of displaying, in real-time, the sequence of plunger position data points and the sequence of plunger load data points in a graphical format pump card. In a refinement to this embodiment, the method further includes displaying a cursor, in real-time, on the graphical format pump card, indicating an instant corresponding pair of the sequence of plunger position data points and the sequence of plunger rod load data points.

In a specific embodiment, the forgoing method further includes the steps of calculating a maximum plunger travel value from the sequence of plunger position data points, and displaying a graphical representation of the maximum plunger travel value on the graphical format pump card. In another specific embodiment, the foregoing method further includes displaying a graphical representation of the pump including the chamber and the plunger, and animating the movement of the plunger according to the plunger position data points. In a refinement to this embodiment, the method further includes calculating, in real-time, a sequence of tubing stretch data points for the tube at a level corresponding to the pump location, and calculated in accordance with the rod surface position data samples, the rod surface load data samples, and the set of structural data for the subterranean well, and animating the movement of the chamber in real time according to the sequence of tubing stretch data points.

In a specific embodiment, the forgoing method further includes the steps of storing in a machine readable file, in real time, the sequence of plunger position data points and the sequence of plunger rod load data points. In a refinement to this embodiment, the method further includes recalling the machine readable file, and reproducing the data points recalled from the machine readable file in a graphical format.

The present invention also teaches a method for real-time pump pressures determination. This method provides for real-time utilization of performance data by a processor, which is associated with a pump lifting well fluids of known physical properties above a liquid level in a casing of a subterranean well through a tube to a surface level, the pump has a chamber with a fluid inlet located below the liquid level that is gated by a stationary valve, and has a plunger slidably engaged with the chamber, the plunger has a known area and a fluid outlet gated by a traveling valve that is coupled to deliver well fluids to the tube, the plunger is reciprocated to vary the displacement of the chamber by a rod extending upward to a cyclical drive unit at the surface. The method includes the steps of obtaining, in real time, a sequence of rod position data samples and rod load data samples corresponding to cyclical operation of the rod at the surface level, and calculating, in real time, a sequence of plunger position data points and plunger load data points corresponding to cyclical operation of the rod at the plunger level, and calculated in accordance with a set of structural data for the subterranean well. The method further includes determining an inlet pressure at the fluid inlet to the pump, and determining a discharge pressure at the fluid outlet from the pump. The method further includes calculating a sequence of pump chamber pressure data points according to the sequence of plunger load data points, and displaying, in real time, a portion of the sequence of plunger position data points, a portion of the sequence of plunger rod load data points, and a portion of the sequence of chamber pressure data points.

In a specific embodiment of the forgoing method, the determining an inlet pressure step further includes determining the liquid level in the casing of the subterranean well, determining a density of liquid in the well fluids from the known physical properties, and determining a density of gas in the well fluids from the known physical properties. Then, calculating the inlet pressure based upon the density of liquid in a liquid column between the fluid inlet and the liquid level, and based upon the density of gas in a gas column between the liquid level and the surface level. In a refinement to this embodiment, the method further includes determining a casing pressure at the surface level, and offsetting the inlet pressure according to the casing pressure. In a further refinement, the determining a casing pressure at the surface level step is accomplished in real-time, simultaneous with the calculating, in real-time, a sequence of pump chamber pressure data points according to the sequence of plunger load data points step. Furthermore, the determining the liquid level in the casing of the subterranean well may be accomplished using an acoustic echo measurement.

In a specific embodiment of the forgoing method, the determining a discharge pressure step further includes determining a density of well fluids from the known physical properties, determining a pump discharge level from the known physical properties, and calculating the discharge pressure based upon the average fluid pressure gradient of the density of liquid in a liquid column between the pump discharge level and the surface level. In a refinement to this embodiment, the method further includes determining a discharge pressure at the surface level, and adding the discharge pressure according to the tubing pressure. In another refinement, the determining a tubing pressure at the surface level step is accomplished in real-time, simultaneous with the calculating, in real-time, a sequence of pump chamber pressure data points according to the sequence of plunger load data points step.

In a specific embodiment of the forgoing method, the calculating, in real-time, a sequence of pump chamber pressure data points step further includes calculation of the sequence of pump chamber pressure data points according to the fluid discharge pressure less the corresponding of the plunger load data points divided by the plunger area.

In a specific embodiment, the forgoing method further includes the steps of generating a graphical representation of the pump, including the chamber and the plunger, animating the movement of the plunger according to the plunger position data points, and displaying the pump chamber pressure values together with the animated movement of the pump components.

The present invention teaches a method of displaying performance information that is associated with a pump lifting well fluids from a subterranean well through a tube, where the pump has a chamber with a fluid inlet that is gated by a stationary valve and a plunger slidably engaged with the chamber, where the plunger has a fluid outlet gated by a traveling valve that is coupled to deliver well fluids to the tube, and where the plunger reciprocated to vary the displacement of the chamber by a rod cyclically driven from a surface level. The method includes the steps of obtaining a sequence of rod position data samples and rod load data samples corresponding to cyclical operation of the rod at the surface level, and calculating a sequence of plunger position data points and plunger load data points corresponding to the reciprocated movement of the rod at the plunger location. Then, calculating a sequence of chamber pressure data points that have an inverses relationship with the sequence of plunger load data points, and displaying the sequence of plunger position data points along a first axis of a graphical plot, and displaying the sequence of plunger load data points and the sequence of chamber pressure data points along a second axis of a graphical plot, thereby producing a unified graphical representation of the plunger load, plunger position, and chamber pressure of the pump during reciprocated movement of the plunger.

In a specific embodiment, the foregoing method includes the further steps of establishing a plunger reference position in the sequence of plunger position data points at a first extreme value of plunger position in the reciprocated sequence, and indicating the plunger reference position along the first axis.

In a specific embodiment, the foregoing method includes the further steps of determining a discharge pressure at the fluid outlet from the pump, and generating a graphical representation of the discharge pressure on the unified graphical representation. In another specific embodiment, the foregoing method includes the further steps of determining a pump inlet pressure at the pump inlet, and generating a graphical representation of the pump inlet pressure on the unified graphical representation.

The present invention teaches a method of displaying performance data associated with a pump lifting well fluids from a subterranean well through a tube, where the pump has a chamber with a fluid inlet that is gated by a stationary valve and a plunger slidably engaged with the chamber, where the plunger has a fluid outlet gated by a traveling valve that is coupled to deliver well fluids to the tube, and wherein the plunger reciprocated to vary the displacement of the chamber by a rod cyclically driven from a surface level. The method includes the steps of obtaining a sequence of rod position data samples and rod load data samples corresponding to cyclical operation of the rod at the surface level, and calculating a sequence of plunger position data points and plunger load data points corresponding to reciprocated movement of the rod at the plunger location. Then, displaying a graphical plot of the sequence of plunger position data points along a first axis of the graphical plot, and displaying the sequence of plunger load data points along a second axis of the graphical plot, thereby producing a unified graphical representation of the plunger load and plunger position during reciprocated movement of the plunger. The method also includes the steps of indicating a plunger position scale along the first axis, including a lowest plunger position indicator, and displaying a graphical representation of the pump adjacent to the first axis of the graphical plot, including the chamber with the stationary valve and the plunger with the traveling valve, and orienting the position of the chamber with respect to the lowest plunger position indicator, and animating the movement of the plunger according to the plunger position data points.

In a specific embodiment, the foregoing method includes the further steps of calculating a sequence of tubing stretch data points for the tube at a level corresponding to the pump location, and animating the movement of the chamber with respect to the lowest plunger position indicator according to the tubing stretch data points. In a refinement to this embodiment, the method further includes incorporating a tubing position scales along the graphical representation of the pump that is drawn to the same scale as the plunger position scale.

The present invention also teaches a method for determining when pump valve actuation events occur. This method provides for real-time utilization of performance data by a processor, which is associated with a pump lifting well fluids above a liquid level in a casing of a subterranean well through a tube to a surface level, the pump has a chamber with a fluid inlet that is gated by a stationary valve, and has a plunger slidably engaged with the chamber, the plunger has a fluid outlet gated by a traveling valve that is coupled to deliver well fluids to the tube, the plunger is reciprocated to vary the displacement of the chamber by a rod extending upward to a cyclical drive unit at the surface. The steps of the method include obtaining, in real time, a sequence of rod position data samples and rod load data samples corresponding to cyclical operation of the rod at the surface level, and, calculating, in real time, a sequence of plunger position data points and plunger load data points corresponding to cyclical operation of the rod at the plunger level. The method further includes determining an inlet pressure at the fluid inlet to the pump, determining a discharge pressure at the fluid outlet from the pump, and calculating, in real-time, a sequence of pump chamber pressure data points according to the sequence of plunger load data points. The method further includes calculating, in real-time, stationary valve actuation events according to an inlet differential pressure between the pump inlet pressure and the chamber pressure, and calculating, in real-time, traveling valve actuation events according to an outlet differential pressure between the pump outlet pressure and the chamber pressure. The method further delivers, in real-time, the stationary valve actuation events and the traveling valve actuation events to a valve actuation data output.

In a specific embodiment of the forgoing method, the stationary valve actuation events include stationary valve opening events and stationary valve closing events, and, the traveling valve actuation events include traveling valve opening events and traveling valve closing events. In another specific embodiment, the method further includes conducting the calculating stationary valve actuation events and the calculating traveling valve actuation events steps in a manner so as to distinguish when a valve test is performed without interrupting the obtaining a sequence of rod position data samples and rod load data samples, and the calculating a sequence of plunger position data points and plunger load data points processes.

In a specific embodiment, the forgoing method further includes the steps of displaying, in real-time, a graphical representation of the sequence of rod position data samples and the sequence of rod load data samples on a graphical format surface card, and displaying indicators, in real-time, of the a stationary valve actuation events and the traveling valve actuation events on the graphical format surface card.

In a specific embodiment, the forgoing method further includes the steps of displaying, in real-time, a graphical representation of the sequence of plunger position data points and the sequence of plunger load data points on a graphical format pump card, and displaying indicators, in real-time, of the a stationary valve actuation events and the traveling valve actuation events on the graphical format pump card.

In a specific embodiment, the forgoing method further includes the steps of generating a graphical representation of the pump including the chamber and the plunger, animating the movement of the plunger according to the plunger position data points. The method further includes generating a graphical representation of the stationary valve and the traveling valve on the graphical representation of the pump, and animating movement of the stationary valve and the traveling valve according to the a stationary valve actuation events and the traveling valve actuation events.

The present invention also teaches a method of determining the liquid and gas ratios in the pumping process. This method provides for real-time utilization of performance data by a processor, which is associated with a pump lifting well fluids of known physical properties, including gas and liquid, above a liquid level in a casing of a subterranean well through a tube to a surface level, the pump has a chamber with a fluid inlet that is gated by a stationary valve, and has a plunger slidably engaged with the chamber, the plunger has a fluid outlet gated by a traveling valve that is coupled to deliver well fluids to the tube, the plunger reciprocated to vary the displacement of the chamber by a rod extending upward to a cyclical drive unit at the surface. The method includes the steps of obtaining, in real time, a sequence of rod position data samples and rod load data samples corresponding to cyclical operation of the rod at the surface level, and calculating, in real time, a sequence of plunger position data points and plunger load data points corresponding to cyclical operation of the rod at the plunger location. The method further includes determining an inlet pressure at the fluid inlet to the pump, determining a discharge pressure at the fluid outlet from the pump, and calculating, in real-time, a sequence of pump chamber pressure data points according to the sequence of plunger load data points. The method further includes determining from the known physical properties of the well fluids, a ratio of a gas portion to a liquid portion in the well fluids, calculating, in real-time, volumetric compression data points of the gas portion within the pump chamber, and delivering, in real-time, the volumetric compression data points to a compression ratio data output.

In a specific embodiment of the forgoing method, the gas portion comprises hydrocarbon gas compounds, and the liquid portion comprises a hydrocarbon liquid compounds portion and a water portion. In a refinement to this embodiment, the method further includes calculating an effective plunger stroke factor by scaling the sequence of plunger position points with the volumetric compression data points, thereby resulting in the effective liquid displacement of the pump chamber. In a further refinement, the method includes displaying the effective plunger stroke factor in a graphical format. In a further refinement, the method includes calculating the pump liquid throughput in accordance with the effective plunger stroke factor, including proportions in accordance with the hydrocarbon liquid compounds portion and the water portion, and calculating the pump gas throughput in accordance with the volumetric compression data points of the gas portion.

In another refinement to the previous embodiment, the method further includes generating a graphical representation of the pump including the chamber and the plunger and animating the movement of the plunger according to the plunger position data. This method further includes graphically representing the gas portion as a proportionally sized gas area and graphically representing the hydrocarbon liquid compounds portion as a proportionally sized oil area within the chamber of the pump, and animating the movement of the gas portion and the hydrocarbon liquid compounds portion within the pump. In yet a further refinement, the method includes varying the size of the proportionally sized gas area in accordance with the volumetric compression data points, thereby animating the compression of the gas portion during cyclic operation of the pump.

BRIEF DESCRIPTION OF THE DRAWINGS

FIG. 8 is a functional block diagram of acoustic liquid level meter according to an illustrative embodiment of the present invention.

FIG. 9 is a diagram of a acoustic liquid level meter interfaced to a wellhead casing according to an illustrative embodiment of the present invention.

FIG. 10 is a functional block diagram of a wireless computer interface according to an illustrative embodiment of the present invention.

FIG. 11 is a front view drawing of a wireless computer interface according to an illustrative embodiment of the present invention.

FIG. 12 is a back view drawing of a wireless computer interface according to an illustrative embodiment of the present invention.

FIG. 22 is a computer display screen for well production information according to an illustrative embodiment of the present invention.

DESCRIPTION OF THE INVENTION

Figure 1:
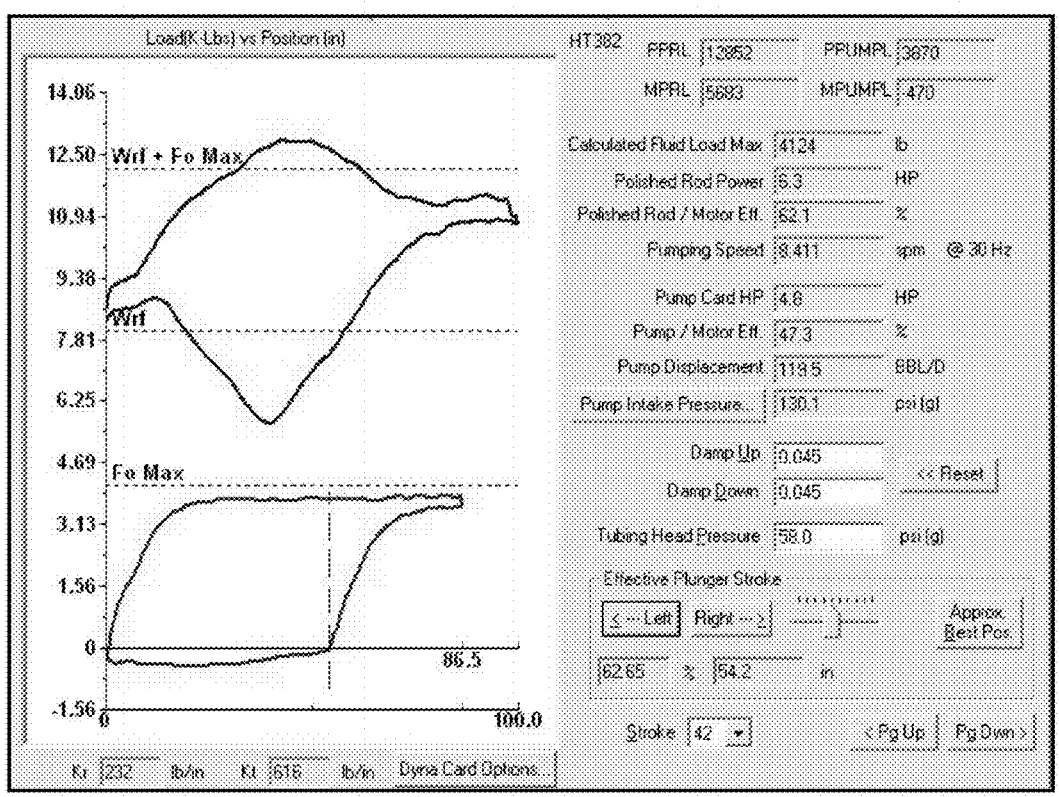
FIG. 1 is a reproduction of a prior art dynamometer test report from the Echometer, Co. Total Well Management System.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The systems and methods of the present disclosure employ a novel and intuitive presentation of the processed well data that is presented in real-time and, which is more readily comprehensible to users and operators than prior art well data systems. Thus, the present invention advances the art by providing a system and method for gathering operational data in real-time from the surface level components of a pumping subterranean well, such as an oil well, and processing that data in real-time to produce detailed information, including animations, of the down-hole dynamic operation of the well. The resultant information is presented to a user in real-time, typically on the display of a portable processing device. However, the resultant information can also be stored and communicated to a remote location. Certain data related to the structure of the well and the nature of the well fluids, as well as prior production data, are used to augment the accuracy of the real-time calculations. As a general comment on the nature and use of the expression "real-time" in this disclosure, it will be appreciated by those skilled in the art that any digital processing device necessarily consumes some time between receiving input data and outputting processed data. This concept is known and is referred to as processor latency by those skilled in the art. For example, a contemporary digital television requires several seconds of processing time to display images of a live broadcast, and such a delay is negligible in virtually all situations. In the case of the present invention, the processor delay is also negligible considering the nature of well operation and the cyclical rates of pumping systems and so forth. However, for the sake of thoroughness, where the expression "real-time" is employed herein, it means that data is gathered, processed, or presented without intentional delay, provided however that real-time latency can be induced by sensors, processing circuits, software processes, output circuits, and display systems.

The inventors of the present disclosure have combined experience gained from many years of computerized analysis of dynamometer records with powerful portable computers, advanced modeling software, and advanced graphical user interface and wireless data acquisition systems to enable the visualization of the operation of a sucker-rod pumped wells in real-time. Through these novel advancements, an operator can now directly observe pump operation in real-time and can determine at a glance whether the pumping system is operating efficiently or requires modification or remedial intervention. The majority of the computations and analysis are performed automatically. If unusual conditions are observed, the user has access to more advanced tools that facilitate a detailed diagnostic analysis. The objective of these systems and methods is to show to the user, at a glance, how the down-hole pump is operating. Generally speaking, this is accomplished by acquiring the surface load and position data while computing "on the fly" the plunger displacement and load, determining the pressure in the pump chamber, determining when pump valve actuations occur, and calculating the percentage of gas and liquid as a function of plunger travel.

The illustrative embodiments presented herein, which are typically directed to use in oil wells and certain gas wells, enable operators to achieve several operational objectives. Among these are the ability to monitor operation of the pump in real time, including chamber fillage, valve operation, determining if the pump is experiencing physical interference between various components, determining the net pump displacement, comparing current performance with previous well tests, and comparison with previously recorded dynamometer tests. The operator can also monitor operation of the pump for some period of time with an objective of detecting pump-off, and to detect any erratic valve operation. Also, gathering data for setting pump timers or pump-off controllers. Gathering information on the accuracy of donut-type load cells used with pump-off controllers. Determining whether the rod loading is within industry standards guidelines, and other operational objective. The illustrative embodiments also provide advanced system capabilities. These include a more simplified test set-up and quick acquisition using a clamp-on polished rod transducer ("PRT") or wireless polished rod transducer ("WPRT"). The systems maximize utilization of high-resolution graphical display outputs, which provides the most important information on one display screen, and the emphasis on graphics over alpha-numeric output. Also, user selectable output content to tailor information to the operator's needs and preferences, including user selectable analysis graphs. Also, the ability to display prior dynamometer test results and simultaneously overlay real-time test results for immediate comparison. And, the ability to import test results and data sets from prior generation systems.

The data acquisition systems of the present invention are designed to allow simultaneous recording of polished rod acceleration and strain, and casing and tubing pressure, and fluid level. The systems also process data so that, on a portion of a display, there is also presented the real time visualization of the fluid level and fluid distribution in the wellbore. This complements the visualization of the pump operation and shows the user the interrelation between the pump operation and the fluids and pressures that exist in the well and at the pump intake, thus providing complete monitoring of the pumped artificial lift system. Visualization of the fluid distribution inside the pump requires analyzing the behavior of the well fluid's gas-liquid mixture as a function of pressure, considering the solubility of the gas phase into the hydrocarbon liquids. In general terms the calculations are based on the Real Gas Law's pressure, volume, and temperature ("PVT") relationship for hydrocarbons. These are obtained from generalized correlations as a function of fluid specific gravities and compositions, including API gravity, pressure, and temperature. The origins of the gas inside the pump barrel include free gas that may be present at the pump intake and/or gas that evolves from the liquid due to pressure drop caused by flow through the pump intake. The rate of gas evolution from or dissolution into the liquids is considered to occur within the timing of typical pumping speed, which is in the range of several seconds per cyclical pump stroke.

Figure 2:
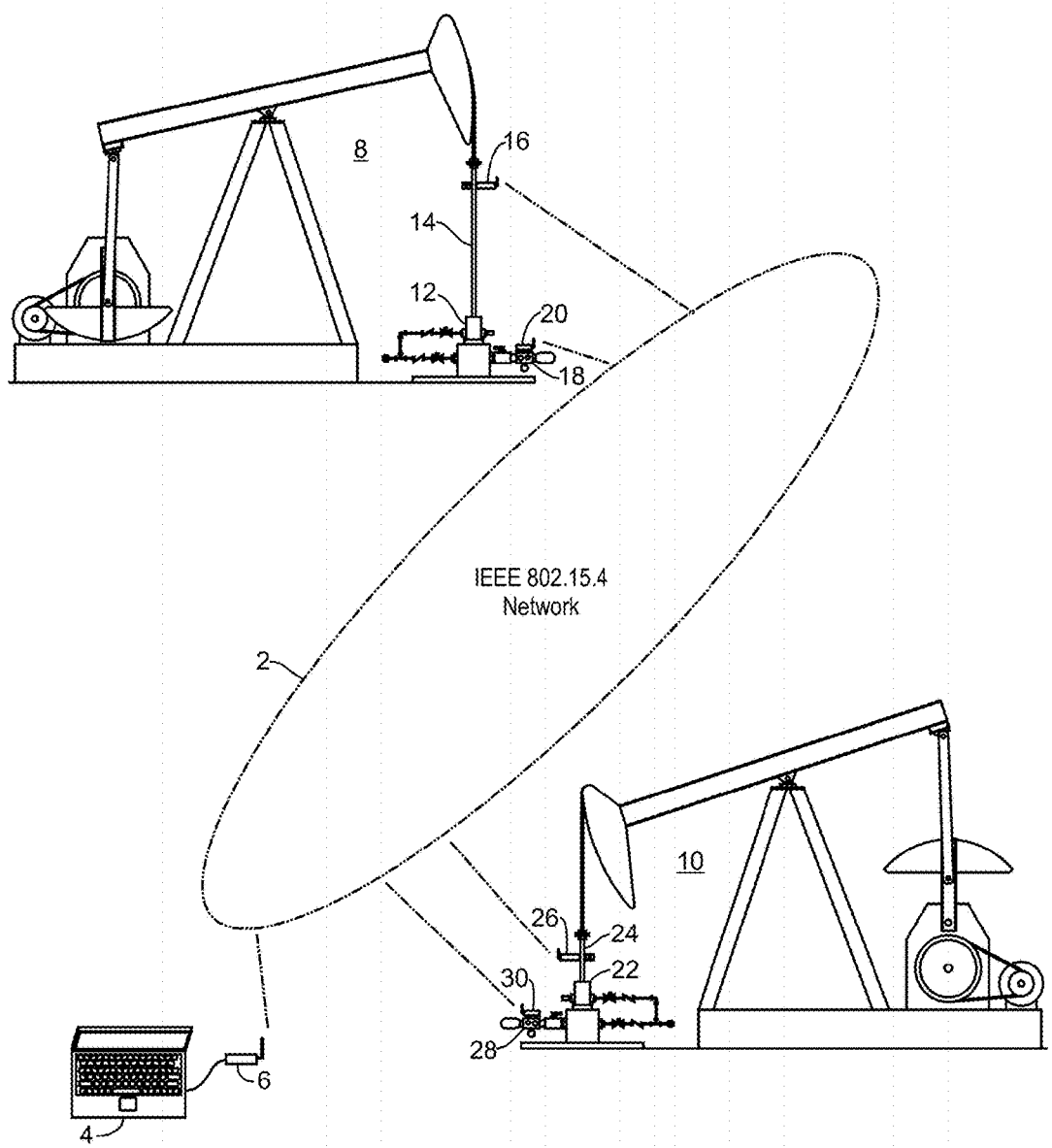
FIG. 2 is a system diagram of two well pumps under test using a wireless interface for the test instrumentation according to an illustrative embodiment of the present invention.

Reference is directed to FIG. 2, which is a system diagram of two oil well pumps under test using wireless interfaces for the test instrumentation according to an illustrative embodiment of the present invention. A first pump jack 8 and a second pump jack 10 are coupled to lift well fluids out of a first well head casing 12 and a second well head casing 22, respectively. "Pump jack" is a customary term used to describe a walking-beam type cyclical reciprocating drive for sucker-rod driven down-hole pump. Pump jack 8 is illustrated at the top of its stroke where the polished rod 14 is drawn upward and fully extended out of the casing 12. A wireless polished rod transducer ("WPRT") 16 is temporarily clamped to the polished rod 14 and travels up and down with the rod's stroke. A radio transceiver in WPRT 16 communicates within a wireless network 2 that generally operates in compliance with I.E.E.E. protocol standard 802.15.4. In the illustrative embodiment, the wireless network operates in the 2.4 GHz band, although other radio frequency bands could be employed. A wireless acoustic liquid level meter and pressure transducer interface 18, which is generally referred to as a wireless remote fire gun ("WRFG") because the acoustic liquid level test is initiated with a burst of gas pressure released in gun-like fashion, is pneumatically coupled to the wellhead casing 12. The WRFG 18 operates to initiate an acoustic echo test into the well casing and then detects the return echo signal for further analysis. The WRFG 18 also comprises pressure transducers that sense well casing pressure and/or well tubing pressure. All of these signals are coupled to wireless transceiver 20, which also communicates with wireless network 2. Similarly, pump jack 10 is illustrated at the lowest position in it stroke, where the polished rod 24 is fully lowered into the well casing 22. Polished rod 24 also has a WPRT 26 temporarily attached thereto, which communicates with the wireless network 2. A second WRFG 28 with wireless transceiver 30 is attached to well head casing 22 and wirelessly communicates within the wireless network 2. In the illustrative embodiments, the protocol defines up to sixty-four data channels when operating a data sample rates of 30 HZ per channel. Higher data rates are supported, which a corresponding reduction in the number of data channels. For example, data rates as high a 4 kHz may be employed to provide high resolution of system performance where needed.

FIG. 2 illustrates a test set-up for a well site having two pumping oil wells. Such tests are run occasionally, so it is preferable for the WPRT's 16 and 26 and the WRFG's 18 and 28 to be attached to the wells on the day of the test, then removed at the end of the test, to be taken to the next well site for subsequent testing elsewhere. The data gathered during the test is coupled to a processor 4, which is typically a laptop type personal computer. The interface to the processor 4 is via a wireless transceiver 6 connected to the processor through a serial port and wirelessly communicating within the wireless network 2 using the aforementioned IEEE protocol standard. Of course, other wireless systems and protocols could be employed, as will be appreciated by those skilled in the art. The wireless feature of this system design is beneficial in that it eliminates the need for interconnecting cables between the host computer and the polished rod transducers and the remote fire gun. Such cables are heavy, cumbersome, subject to failure, and generally require greater effort to utilize. However, it is to be understood that the real-time measuring, processing, testing and display features of the present invention could be implemented with a system employing either wireless interfaces or wired interfaces. The processor 4 executes software programs and algorithms that enable a wide range of functions of the present invention, including gathering test measurements, maintaining reference database information, processing data to provide real-time results, generating graphical and alpha-numeric output data, and driving hardware devices including a display and serial port, as well as other features of the present invention discussed more thoroughly hereinafter.

Figure 3:
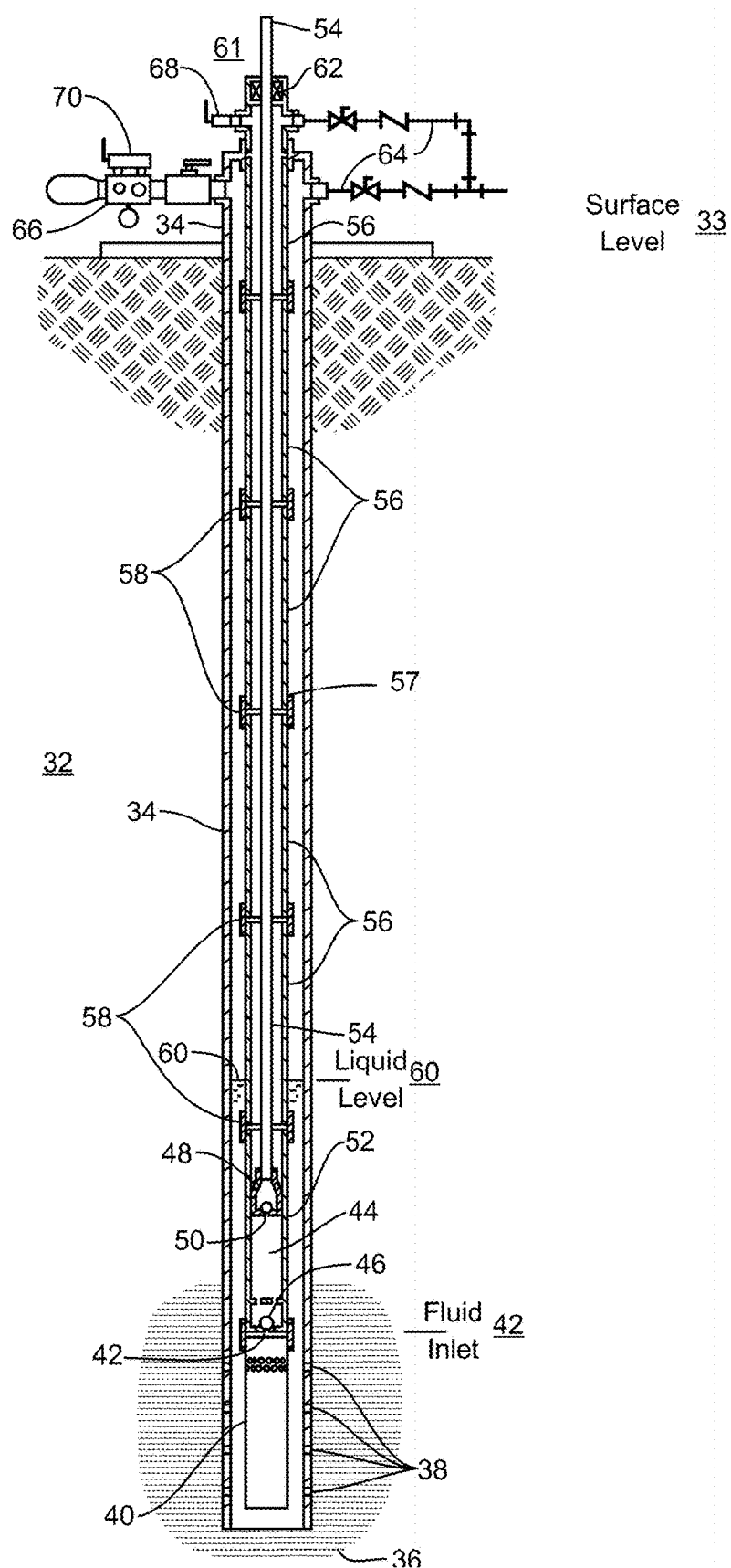
FIG. 3 is a section view of a well borehole and pumping equipment according to an illustrative embodiment of the present invention.

Reference is directed to FIG. 3, which is a section view of a well borehole and pumping equipment according to an illustrative embodiment of the present invention. While there are a number of subterranean well designs in use today, the well 32 illustrated in FIG. 3 is one that is useful as a point of reference in an illustrative embodiment for many of the features of the present invention. The well 32 is built by drilling a borehole down from a surface level 33 to a geological formation 36 that contains the desired well fluids, and in the illustrative embodiment those are crude oil and natural gas. Water is a byproduct of well operation, and must be dealt with during operation. As the well 32 is drilled, a well casing 34 is placed into the borehole to maintain its integrity over time. In the area of the formation 36, the well casing is perforated 38 to enable well fluids to flow into the casing and to enable the desired pumping operation for recovery of those fluids at the surface. The well fluids will generally seek an equilibrium condition and establish a liquid level 60 at some depth within the casing 34. The well fluids are comprised of crude oil, natural gas and water. Thus, the casing above the liquid level 60 is filled with natural gas. Below the liquid level 60, the casing is filled with a mixture of water and crude oil, with some gas mixed therein. However, it should be noted that the liquid contains a significant portion of the gas bubbles that rise, and that the crude oil and water also migrate within the liquid according to their respective densities and viscosities. At the times that pumping occurs, the fluid dynamics in the well are complex.

After the well casing 34 is built in FIG. 3, a tubing string 57 is lowered from the surface level 33 into the region of the formation 36 and below the liquid level 60. The tubing string 57 is generally comprised of plural tubing sections 56 that are interconnected with plural couplings 58, although continuous tubing strings are known in the art. As a side note, the scale of FIG. 3 is greatly distorted to illustrate details. In particular, the depth of the well 32 would typically be in the range of thousands of feet while the diameter of the casing is in the range of several inches. At any rate, a pump assembly 52 is attached to the bottom of tubing string 57. The pump consists of a chamber 44 with a stationary check valve 46 at the bottom coupled to the pump inlet 42. This is also referred to as the fluid inlet 42. Attached to the pump inlet 42, there is a gas-liquid separator 40, which is commonly called a "gas anchor". The gas anchor 40 functions to divert most of the gas away from the pump inlet so that pump efficiency is enhanced in that a greater percentage of liquid is pumped. Gas in the pump chamber 44 compresses and reduces the effective pump displacement and efficiency. The pump 52 further includes a plunger 48 that includes a traveling check valve 50. As the plunger cycles up and down, the volume of the chamber 44 is displaced, and the valves 42 and 50 work cooperatively to force fluids upward through the pump 52 and into the tubing string 57. The plunger 52 is driven by a sucker-rod string 54 that is located within the tubing string 57. The sucker-rod extends up to the surface level 33, and is terminated with a polished rod portion to sealably engage a gland seal 62. The sucker rod 54 may employ a diameter that changes in steps to account for gradually increasing load toward the surface level.

With respect to the surface level equipment in FIG. 3, the top of well 32 is terminated by a well head assembly 61 consisting of a casing head and pumping tee, which couples to the top of the well casing 34 and the top of the tubing string 57. The sucker rod 54 passes through the well head casing 61, and a gland seal 62 is used to seal gases and liquids from the ambient environment. The top portion of the sucker rod 54 is polished to maintain a tight seal, and is thusly referred to as the polished rod. The liquids and gases produced by the well 32 are routed to processing and storage equipment (not shown) by a plumbing system 64. And acoustic echo meter 66 is pneumatically coupled to the annulus between the interior of the casing 34 and the exterior of the tubing string 57. An acoustic shock wave is released into the annulus, and the resulting echo is detected by the acoustic liquid level meter 66, which is used to measure the actual liquid level 60 and other useful data. A wireless transceiver 70 is used to communicate with the echo meter 66. A wired interface can also be used. The echo meter 66 also includes a pressure sensor that detects the casing pressure at the surface level 33. In addition a tubing string pressure sensor 68 is coupled to the interior cavity of the tubing string 56 to detect the pressure therein, and also wirelessly communicates within the aforementioned wireless network.

Figure 4:
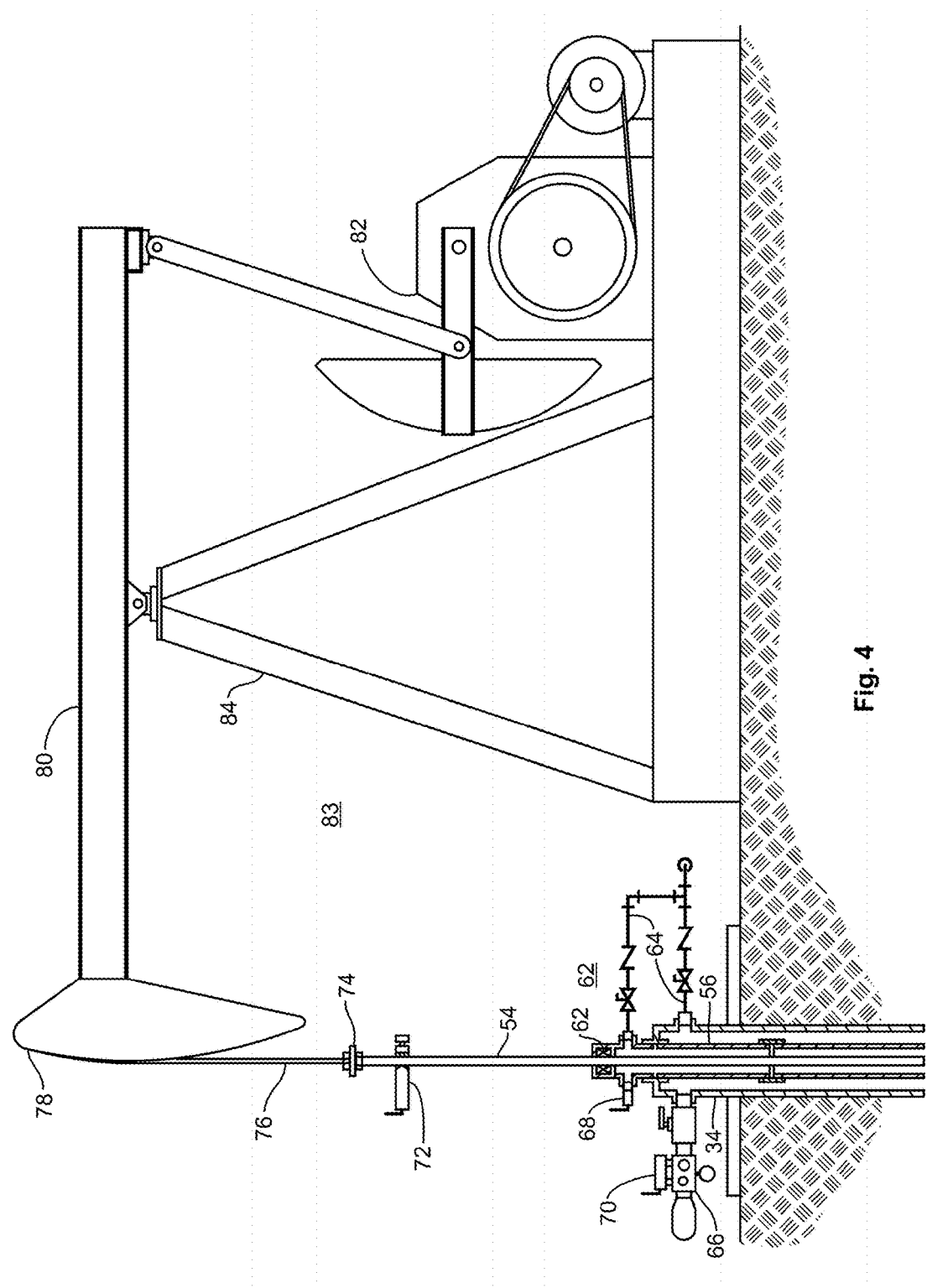
FIG. 4 is a drawing of a surface mounted reciprocating drive unit coupled to a wellhead assembly under test according to an illustrative embodiment of the present invention.

Reference is directed to FIG. 4, which is a drawing of a surface mounted reciprocating pump drive 83 coupled to a wellhead casing 61 under test according to an illustrative embodiment of the present invention. FIG. 4 corresponds to the subterranean well equipment discussed in regards to FIG. 3. In FIG. 4, a conventional reciprocating drive unit 83, also referred to as a pump jack, cycles the polished rod 54 up and down to drive the subterranean well pump (not shown). The drive unit 83 consists of a reduction drive with Pitman arm 82 coupled to a walking beam 80, which is supported on a Sampson post 84. A horse head 78 on the walking beam 80 supports a cable bridle 76 which is connected to the polished rod 54 by a carrier bar 74. These are well known terms of art. A wireless polished rod transducer ("WPRT") 72 of the present invention is temporarily clamped to the polished 54, and cycles up and down with the polished rod 54 during the test procedure. The wellhead components of FIG. 4 where previously described with respect to FIG. 3.

Figure 5:
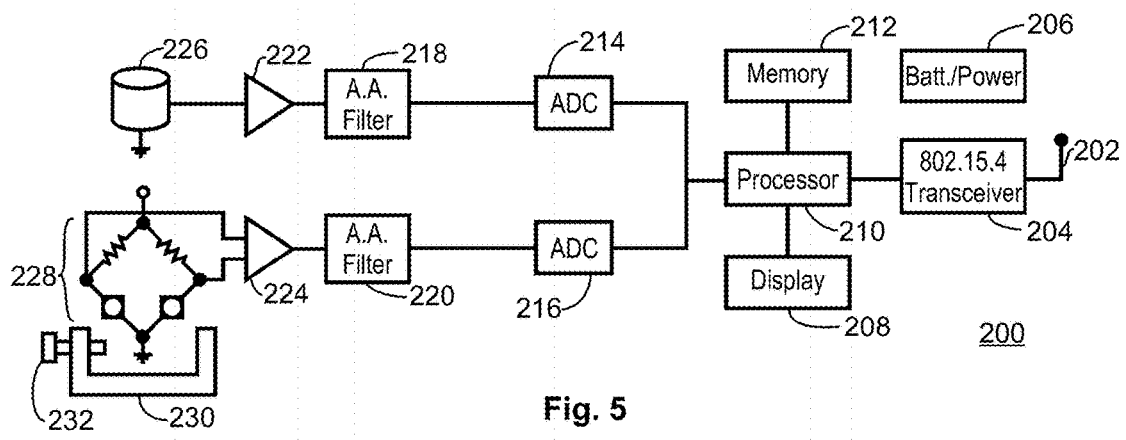
FIG. 5 is a functional block diagram of a wireless polished rod transducer according to an illustrative embodiment of the present invention.

Reference is directed to FIG. 5, which is a functional block diagram of a wireless polished rod transducer ("WPRT") 200 according to an illustrative embodiment of the present invention. Attention is again directed to the McCoy et al. U.S. Pat. Nos. 5,406,482 and 5,464,058 U.S patents discussed in the Background of the Invention section. The illustrative embodiment of FIG. 5 advances the art with the use of a wireless transceiver 204 and certain advanced processing techniques and features to enhance and simplify well testing procedures. The physical sensors of the WPRT 200 are an accelerometer 226 and a group of strain gauges wired in a Whetstone bridge circuit 228 (collectively "strain gauge"). The accelerometer 226 detects acceleration in the up and down movement of the polished rod. The raw signal is amplified by amplifier 222 and filtered by anti-aliasing filter 218 prior to being digitally samples at a rate of 30 Hz by analog to digital converter 214. The sampled acceleration signal is then coupled to processor 210. The strain gauge 228 is clamped to the polished rod by C-clamp structure 230 and setscrew 232. The setscrew 232 is tightened to preload the bridge circuit 228 into a suitable operating tension. As the polished rod cycles up and down, the tensile load changes and the strain gauge 228 detects minute changes in the rod diameter. This data is processed to determine the magnitude of the tensile load on the polished rod. The differential voltages across nodes the Whetstone bridge 228 are amplified by differential amplifier 224 and are then filtered by anti-aliasing filter 220 before being sampled at a rate of 30 Hz by analog to digital converter 216. The sampled strain data is then coupled to a processor 210 in the WPRT circuit 200. Note that ADC 214 and ADC 216 are synchronized so that the data sample sets precise coincide in time. The processor 210 has access to memory 212 for temporary storage of variable, reference values, unit identity, and program object code. An I.E.E.E. 802.15.4 compliant transceiver 204 is used as a communications link into a local wireless network. A display 208, comprised of plural light emitting diodes, is provided for basic operational indicators, including a strain gauge pre-load indicator function. A battery and power circuit 206 in the WPRT 200 provides power to the circuits discussed above.

Figure 7:
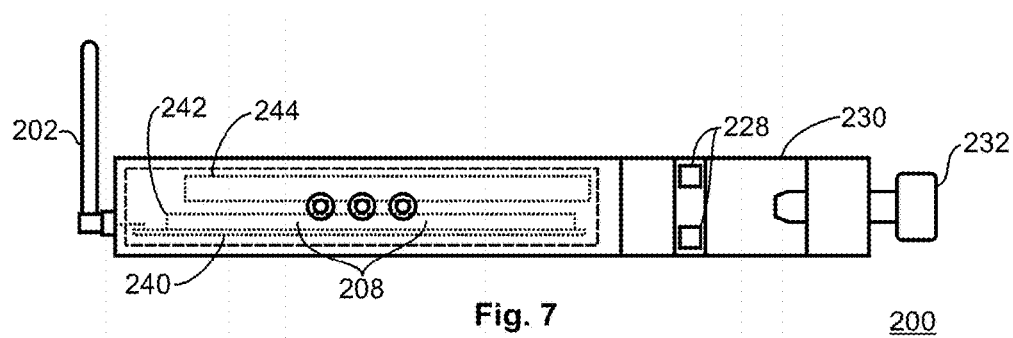
FIG. 7 is a side view drawing of a wireless polished rod transducer according to an illustrative embodiment of the present invention.
Figure 6:
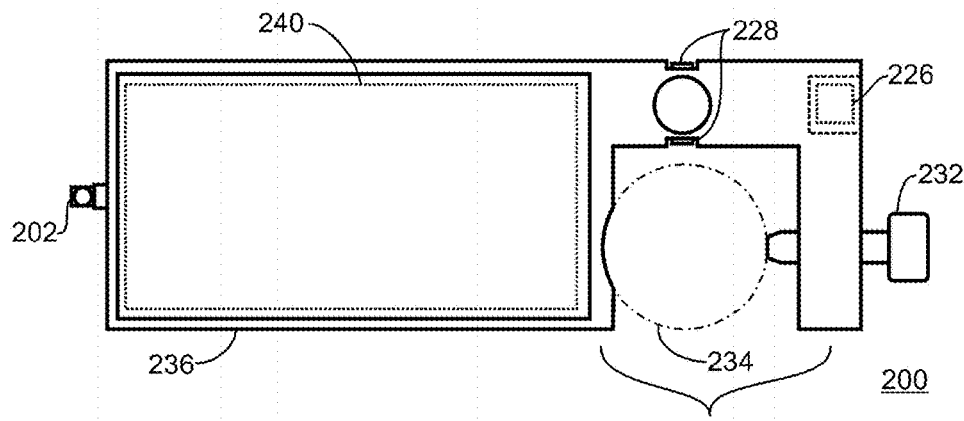
FIG. 6 is a top view drawing of a wireless polished rod transducer according to an illustrative embodiment of the present invention.

Reference is directed to FIG. 6 and FIG. 7, which are top view and side view drawings, respectively, of a wireless polished rod transducer according to an illustrative embodiment of the present invention. The structure of FIG. 6 and FIG. 7 correspond, in part, to the functions of FIG. 5. The WPRT 200 is fabricated as a single structural unit, machined from a suitable material such as stainless steel, to provide a rugged and unified device. One end of the device is formed in the aforementioned C-clamp 230 configuration, with a setscrew 232 provided to clamp the unit onto a polished rod 234 at the time a test is conducted. The strain gauge sensors 228 are locate along the clamp 230 to detect the strain forces applied to the polished rod 234, which change along with minute changes in the rod 234 diameter. The accelerometer 226 is fixed within the frame of the WPRT 200 as well. The other end of the WPRT 200 frame comprises a cavity 236 for housing 236 the aforementioned circuitry. A printed circuit board 240 and circuit components 242 are located therein. The storage battery 244 is also locating in the cavity 236. The antenna 202 for the transceiver 204 extends out from the cavity 236. The display 208 LEDs appear on the exterior of the WPRT 200.

Reference is directed to FIG. 8, which is a functional block diagram of a acoustic liquid level meter 100 according to an illustrative embodiment of the present invention. Since the acoustic liquid level meter 100 releases a strong acoustic pulse to initiate a measurement, it is referred to as a "gun", and since it is remotely activated, it is referred to as a remote fire gun. In the case of the wireless embodiment, a wireless remote fire gun, or "WRFG". Since the WRFG 100 is coupled to the well casing annulus, it is also used as a host interface for a pressure sensor 114. This is particularly useful where several sensors are coupled to a single wireless transceiver, or a common interface cable. In the illustrative embodiment of FIG. 8, there is a pressure sensor a casing pressure sensor 114. The acoustic echo meter 100 includes a solenoid valve 104 to release a precharged pressure canister on demand, and a piezoelectric microphone 108 to 'listen' to the return echo signals. The solenoid valve 104 is driven by a drive circuit 106. The microphone 108 is coupled to an amplifier 110, which is coupled to an anti-aliasing filter 112, before being sampled by an analog to digital converter 122. In the illustrative embodiment, the microphone is sampled at 1 kHz. The casing pressure sensor 114 is coupled to anti-aliasing filter 116 before being sampled at 30 Hz by analog to digital converter 123. The sampled signals are then coupled to processor 126. The processor 126 has access to memory 128 for temporary storage of variable, reference values, unit identity, and program object code. An I.E.E.E. 802.15.4 compliant transceiver 130 is used as a communications link into a local wireless network. A display 150, comprised of plural light emitting diodes, is provided for basic operational indicators. A battery and power circuit 132 in the WRFG 100 provides power to the circuits discussed above.

Reference is directed to FIG. 9, which is a drawing of a wireless remote fire gun ("WRFG") 100 interface to a wellhead casing 101 according to an illustrative embodiment of the present invention. FIG. 9 generally corresponds to the functions of FIG. 8. In FIG. 9, the WRFG 100 is acoustically coupled to the well casing 101 so as to conduct echo meter measurements. The WRFG 100 includes the solenoid valve 104 and the piezoelectric microphone 108. There is a casing pressure senor 114 pneumatically coupled to the casing through the RFG 100. All of the components are interface to the control circuit 102, which includes the interfaces, processor and wireless transceiver. Antenna 134 communicates within the wireless network. All of these instruments are interface to the wellhead at the time of testing. Additionally, there is tubing pressure sensor 118 in FIG. 9 that is pneumatically coupled to measure the tubing 103 pressure level. The tubing pressure sensor 118 includes its own anti aliasing filter (not shown), 30 Hz analog to digital converter (not shown), processor (not shown) and wirelessly transceiver (not shown) coupled to antenna 135 for communicating within the wireless network. The digital and communication circuits are essentially the same as for the RFG of FIG. 8.

Reference is directed to FIG. 10, which is a functional block diagram of a wireless computer interface 140 according to an illustrative embodiment of the present invention. As was discussed regarding FIG. 2, the wireless network is hosted by a personal computer with a wireless interface. FIG. 10 is an illustrative embodiment wireless interface 140. A ZigBee compliant transceiver 142 with antenna 144 is interface to a processor 156. The processor 156 has access to memory 154 for storage of variable, reference data and program code. A display 150 provides a limited user interface to indicate status of device operation. A battery and power circuit 148 is provided to power the various circuits in the device. A serial interface port 146 is coupled to the processor 156, and provides the point of interface to a personal computer 156, which external to the wireless interface 140.

Reference is directed to FIG. 11 and FIG. 12, which are front view and back view drawings, respectively, of the wireless computer interface 140 according to an illustrative embodiment of the present invention. These figures correspond to FIG. 10. The wireless interface is housed in a rugged enclosure 140, which has an antenna and connector 144. The display indicators 150 are plural LED's on the front to indicate system status information to the user. On the back are a pair of USB serial port connectors 146A and 146B, with different physical configurations. There is also a pair of power connectors for use in vehicular and fixed charging applications.

Figure 13:
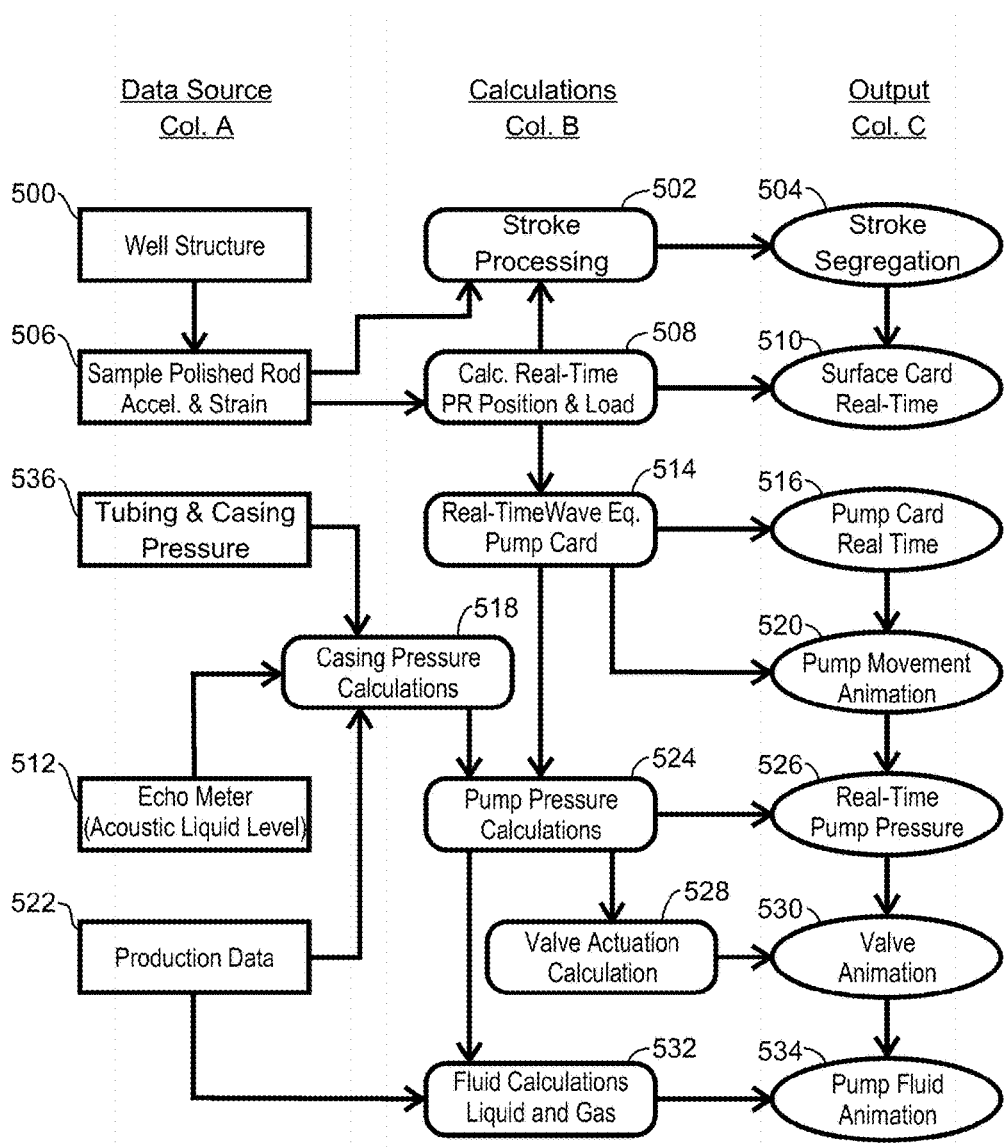
FIG. 13 is a processing diagram according to an illustrative embodiment of the present invention.

Reference is directed to FIG. 13, which is a processing diagram according to an illustrative embodiment of the present invention. The methods of the presently claimed invention are primarily executed on processors. The test equipment, including the polished rod transducer, the acoustic liquid level meter, and the pressure sensors are coupled to a well and then the test measurements are taken in real-time. The data received from the test equipment is also processed in real-time and the resultant output information is displayed in real-time as well. In an illustrative embodiment, a portable personal computer is used as the data processing processor. The test equipment also utilizes processors for certain functions related to that sensor's operations and communications with the processor in the computer, including wireless communications. Thus, most of the software is loaded onto the computer and is execute by the computer in real-time. In addition to the real-time test data, the computer has access to a static database of information that is also used in the calculations. This information includes data on the well structure under test, data on the nature of the well fluids, and data about the well production history. The database may contain information for a great number of wells. The system also accumulates current real-time test data into the database, which is beneficial for comparing real-time performance data with past test data. It is instructive to compare current performance with past performance of a given well. In addition, the processor can generate portable files of information that can be communicated to other processors for concurrent or later review. For example, a pump animation file can be generated in a standardized format, such as an MPEG file, and communicated to a distant location via the Internet so that others can witness or review a test operation. There are interrelationships in the databases and test data, as well as in the calculations that process them. These build upon one another to an ultimate output in a graduated fashion. FIG. 13 presents a logical arrangement of these processes.

In FIG. 13, the left hand column, labeled Col. A, presents functional blocks representing sources of data and information. The center column, labeled Col. B, presents functional blocks that represent calculations and data processing activities. The right column, labeled Col. C, presents functional blocks that represent output processing and display activities. Block 500 represents the database information characterizing the well structure and equipment specifications. For example, this would include the depth of the well, the diameter and length of the sucker-rod, and, the diameter, weight, and length of the tubing string, the characteristics of the pump-jack, the specifications of the down-hole pump and so forth. This information is input to the database manually, or is transferred from another source where the information has already been tabulated. This is important information because it is relied upon for a great number of the calculations, notably the wave equation modeling of down-hole pump dynamics, the fluid column pressure calculations, and efficiency calculations. Block 506 represents the function of gathering the polished rod acceleration and strain data in real-time from the polished rod transducer. It can also represent the similar data recalled from a database for use in past and present operation comparisons. Having the well structure information 500 and the real-time polished rod transducer acceleration and strain sampling data, the processing of block 508 can be undertaken in real-time. This block applies a set of calculations that convert the acceleration data into velocity data and then into position data, and also converts the strain data into load data in real time. Having the stream of real-time polished rod position and load data available, the process can directly output a surface card at block 510, including a cursor showing the instant advancement of the surface card in real-time. In practical terms, this means that the computer hosting the inventive processes can now display a real-time graphic of the surface card, plotted as the pump operates in real-time, subject only to a moment of processor latency.

Another feature of the present invention is the system's ability to identify and segregate individual strokes of the pumping operation, and its ability to delimit them in a consistent manner, such as at the top or bottom of each pump jack stroke. At the beginning of each real-time test session, the system conducts a stroke processing operation to isolate individual strokes of the pumping system and to determine a suitable point to delineate individual strokes. Stroke processing is more fully discussed with references to FIG. 14, hereinafter. Continuing now in FIG. 13, having both the raw sensor data from block 506 and the position and load data from block 508 in FIG. 13, the process is enabled to conduct the stroke processing at block 502. Stroke processing is a fairly complex process of analyzing raw acceleration data, smoothing it, detecting patterns and thresholds, and then applying those to the processed position data. Once this has been accomplished, the functional block of segregating and delimiting the individual strokes can be accomplished at block 504, and the stroke reference position can be used to synchronize all data in the various processes, one of which is the orienting of the stroke cycles in the surface card 510. The data sets can be presented and stored as individual strokes in the illustrative embodiment, or the raw data can be re-processed at a later time. The next steps in the processes are to develop the data representing the down-hole pump operation, most notably the pump card, in real-time.

Functional block 514 in FIG. 13 represents the real-time calculation of the pump load and position through use of the wave equation calculation process, and also the real-time tubing string stretch, if applicable. The program code of the illustrative embodiment processes the stream of load data in conjunction with the positional data to generate a down-hole pump card dataset. Mathematical relationships have been developed to calculate the load in a moving rod at distances from a reference point. See Gibbs, S. G., "Predicting the Behavior of Sucker Rod Pumping Systems", Journal of Petroleum Technology, July 1963, and the prior art cited in the Background of the Invention section, above. The surface change in load data generated by the polished rod transducer is used in conjunction with surface acceleration, velocity and position data to calculate loadings on a down hole pump. The movement and dynamic effects of the rod as well as damping factors are considered in the calculation of the down hole pump card, which can be graphed as load versus position. This process takes input from the well structure, block 500, and the real-time polished rod position and load data stream, block 508, and calculates in real-time, the rod position and load at the point where the pump plunger attaches to the rod. Having the pump load and position data stream available, the system can present a pump card in real time at block 516. This can also include a moving cursor on the pump card that highlights the instant position and load of the pump plunger in real-time. Furthermore, since the pump position data stream is available, block 514, and the structure of the pump is known, block 500, the system is enabled to present an animation of the pump movement in real-time at block 520. There are a finite number of pump configurations used in the industry, and the software is enable to select a pump graphic based one the actual structure of the well, block 500, and present a suitable pump graphic in the animation. The plunger of the pump is moved in real-time in the animation according to the pump card position data. Additionally, the stretch of the tubing string during the pumping cycle can also be calculated in the wave equation calculations, and can also be animated in the pump animation. What results is a remarkably clear and intuitive picture of what is happening with the down-hole pump. This is a novel test, calculation and presentation sequence that provides great utility to the operator, and it is provided in real time.

Another aspect of the system operation in FIG. 13 is the ability of the test equipment to measure the liquid level of the well casing. This is represented by the echo meter at block 512. Since data on the well fluids is known to the system from block 522, including specific gravity, and since the depths of the well components is know from the well structural data, block 500, the system can calculate system static pressure based on the gravity of the liquid and gas columns. At block 518, the system calculates the pump inlet pressure based on the column of gas and liquid in the casing. This is due, in part, by the availability of the tubing and casing pressure data measured at block 536. This enables the system to accurately calculate pump pressures at block 524. The pump discharge pressure can be calculated from the weight of the liquid column in the tubing string, again, based on the gravity of the well liquid and the depth of the pump in the well. The tubing surface pressure can be added improve accuracy of the discharge pressure calculation. As noted, the pump inlet pressure and discharge pressure are known. Also, the system as the instant real-time load on the plunger from block 514. In addition, the area of the pump plunger is known from block 500. Therefore, the pump chamber pressure, in real-time, can be calculated as the discharge pressure less the force on the plunger divided by the area of the plunger, and net of the pump inlet pressure. This set of calculations at block 524 provides a vivid depiction of pump dynamics in real-time, and this information is present to the user at block 526.

Continuing in FIG. 13, since the real-time pump dynamic pressures are known, this information can be used to determine when the stationary valve and the traveling valve transition between open and close states because these transitions are largely dependent upon differential pressure in the pump. And, these calculations are conducted at block 528. Knowing the real-time valve actuation times, the system adds this to the pump animation at step 530. Thusly, the physical valve movement, another vivid presentation of real-time pump operation is added to the real-time animation. Block 532 takes this to an even higher level by incorporation gas compression dynamics into the calculations. The production data, block 52, provides useful information about the ratio of gas to liquid production, including gas to oil and gas to water. Also, the real-time pump card, 516, provides an indication of the gas compression phase of each upstroke. This information enables the system to calculate the volumetric compression of the gas in the pump chamber in real-time. This ratio is used to present a two-dimensional compression graphic in the pump animation at step 534. This is output for the user by graphically presenting bubbles of gas and oil flowing though the pump chamber in the pump animation, and scaling the bubble sizes according to volumetric ratios, in real-time, and then scaling the size of the two-dimensional gas bubbles according to the gas compression data at block 534. The sequence of activities in FIG. 13 will be more fully developed as the subsequent screen-shots of the illustrative embodiment are presented and explained below.

The foregoing discussion outlines the core information flow in the real-time processing operation of the illustrative embodiment. It is noteworthy that there are many other metrics and performance aspects addressed in the system that provides useful information to the operator. For example, there are various ways to consider the weights of the structure and forces acting down-hole that are indicators as to system operation. There are also a number of graphical presentation techniques that are familiar to operators based on prior art presentation methods that can be employed. These aspects will also be addressed in the following discussions.

Figure 14:
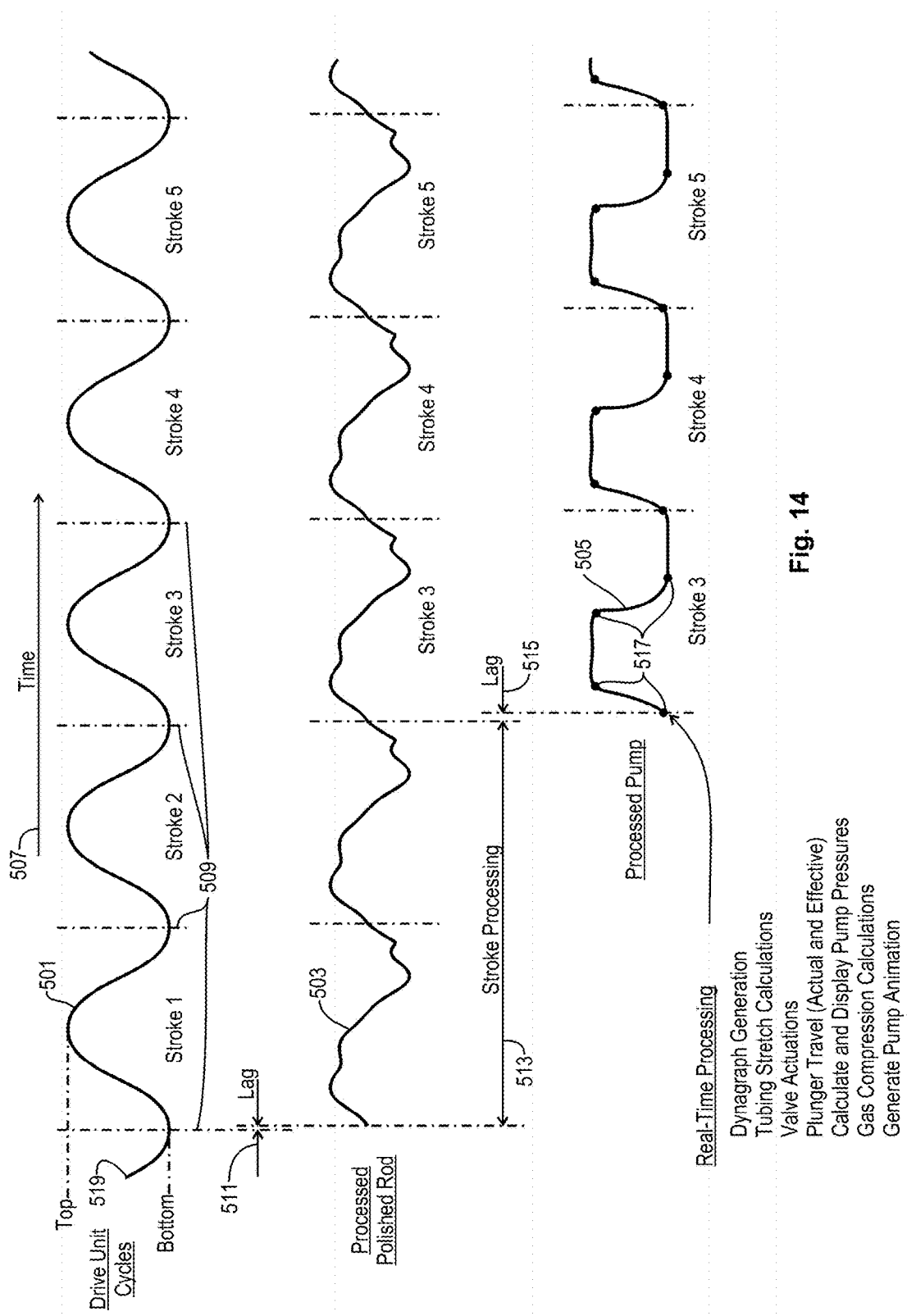
FIG. 14 is a processing timing diagram according to an illustrative embodiment of the present invention.

Reference is directed to FIG. 14, which is a processing timing diagram according to an illustrative embodiment of the present invention. As was briefly mentioned above, the system of the illustrative embodiment employs a stroke processing algorithm to "prime" the real-time operations of the system. FIG. 14 is presented to clarify some of the timing aspects in operation of the illustrative embodiment system, including the stroke processing function 513. The graphical plots presented in FIG. 14 are not typically generated as direct output, although the data represented in the plots is generated and utilized in certain output functions of the system. The first plot, 501, is sinusoidal and represents the cyclical movement of the surface drive unit over time 507, such as the motion of the polished rod driven by a conventional pump jack. Each full cycle of the drive unit amounts to a single stroke of the polished rod from bottom to top and back to bottom. The strokes are conveniently divided at the bottom position of each cycle 509, and are number in the drawing; Stroke 1, Stroke 2, Stroke 3, Stroke 4, etc. Plot 501 can thus be appreciated to be the mechanical position of the polished rod as a function of time. The data the represents plot 501 is input into the system of the present invention using the polished rod transducer, which is coupled to the polished rod at some moment in time, represented by point 519 on plot 501. Plot 503 represents the ongoing load on the polished rod, which is actually calculated from the raw acceleration data and raw strain data gathered by the polished rod transducer. Plot 505 represents the calculated load on the pump, which is derived from the load and position data on the polished rod in conjunction with mechanical and structural information known about the well under test. Note that the processed pump curve 505 is not accurately generated until after the completion of the stroke processing function. Note further that there is a processor lag time 511 between the instant the polished rod actually moves and the instant that the processed polished rod data 503 can be presented. Further, there is even more lag 515 between the instant that the processed polished rod data 503 is available and the instant that the process pump data 505 has been computed. The relationship of the data processing flow was discussed above with regard to FIG. 13. It is further noted, that it is beneficial to synchronize the presentation of all aspects of the data presented in the illustrative embodiment system, even though its actual moment of presentation my be slightly delayed by processor latency.

The stroke processing function and time period 513 enable the illustrative embodiment to accurately identify individual pumping unit strokes, and also to reliably delineate them within the collected raw data set, for example, by reference to the data point at the lowest position of the polished rod during each stroke. This reference point can then be used to synchronize all of the data extracted and presented in this disclosure even though that extracted data has been subject to some processor latency. To accomplish this, the real-time process employs a two stroke priming period 513, in FIG. 14, which operates as follows. The polished rod transducer, once attached, provides a continuous stream of load and acceleration data, which is sampled at 30 Hz in the illustrative embodiment. A full stroke of the surface pumping unit is one cycle of the up and down motions of the pumping unit head, beginning and ending at identified junctures of oscillation, which again, is the bottom of each stroke in the illustrative embodiment. Identifying individual strokes on an ongoing basis in the real-time stream of acceleration data is at the core of synchronization in the illustrative embodiment of the present invention. Strokes of the pumping unit are assumed to follow a consistent cyclical path, resulting in a sinusoidal shape of the data stream, similar to plot 501 in FIG. 14. The pumping units have a mechanically fixed stroke length, although the duration of these strokes does vary. Ideally, finding corresponding points in each subsequent upstroke enables precise identification of the pumping cycle operations. The nature of the data collected presents challenges to readily identifying these corresponding points. The "noisy" acceleration curve and misalignment of discrete points in consecutive strokes, due in part to fixed rate sampling, increase the difficulty in identifying strokes.

The illustrative embodiment stroke processing method locates and extracts a segment of data that represent two strokes of the pumping unit, illustrated as the Stroke Processing 509 in FIG. 14. This is based on the sampling of the acceleration of the polished rod a 30 Hz, creating an ongoing stream of discreet raw acceleration data points, which presents the "noisy" curve profile. The raw acceleration data is filtered using a box-car filter, which act as a broad-band moving average filter, to smooth the shape of the acceleration curve. The process then identifies reference lines at the $25^{th}$ and $75^{th}$ percentiles of the smoothed curve's value range. Useful points are identified, including positive crossing points, where the filtered curve crosses the $75^{th}$ percentile line in a positive direction, and negative crossing points, where the filtered curve crosses the $25^{th}$ percentile line in a negative direction, thus producing a sequence to crossing points arranged as negative, positive, negative, positive, etc. The process then selects a "candidate" two-stroke interval 513 between negative crossing points, and then reason tests the sequence of negative and positive crossing values to determine if they are within reasonable interval to time and magnitude values. Assuming they are, the process then centers the candidate segment about zero to prepare for integration. Next, the process integrates the acceleration data, as opposed to the filtered data, within candidate interval to yield a velocity curve for the candidate period. Then, the process identifies positive and negative zero crossing points and peak values in the velocity curve, and compares values of consecutive velocity peaks to determine if the data set truly defines a two-stroke interval. A value differential of less than one percent is expected, and if true, confirms validity of the interval. The process then extracts a single stroke between a first peak and a second peak in the velocity curve. It then centers the single stroke of the velocity curve about zero to prepare form integration to a position curve. The velocity curve is integrated to generate a position curve for one stroke, where the first minimum in the position curve is defined as the bottom of the stroke, which is applied as the zero position to the present raw data stream. Furthermore, the process continuously applies the forgoing test sequence to maintain real-time stroke zero position (bottom) segregation of streaming raw data. Thusly, the system can calculate the pump dynagraph in real-time and reference position and time to aforementioned surface dynagraph care frame of reference, all based on a common reference position in the raw streaming data. Furthermore, this reference point carries through all of the time sensitive data calculations so that all output data and graphical elements of the present invention are fully synchronized. Not that this process can also be applied to raw data that has been saved from a prior test.

Again considering FIG. 14, note that the real-time movement curve 501, the processed polished rod curve 503, the processed pump curve 505, the calculated valve actuation events 517, and other processed data (e.g. dynagraph generation, tubing stretch calculations, plunger travel, pump pressures, gas compression pump animations, and others) can be synchronized at the time of output presentation by reference to the stroke segregation in the raw data, even thought the processor latency of the processor running the processes produces time lags 511, 515, and others.

Figure 15:
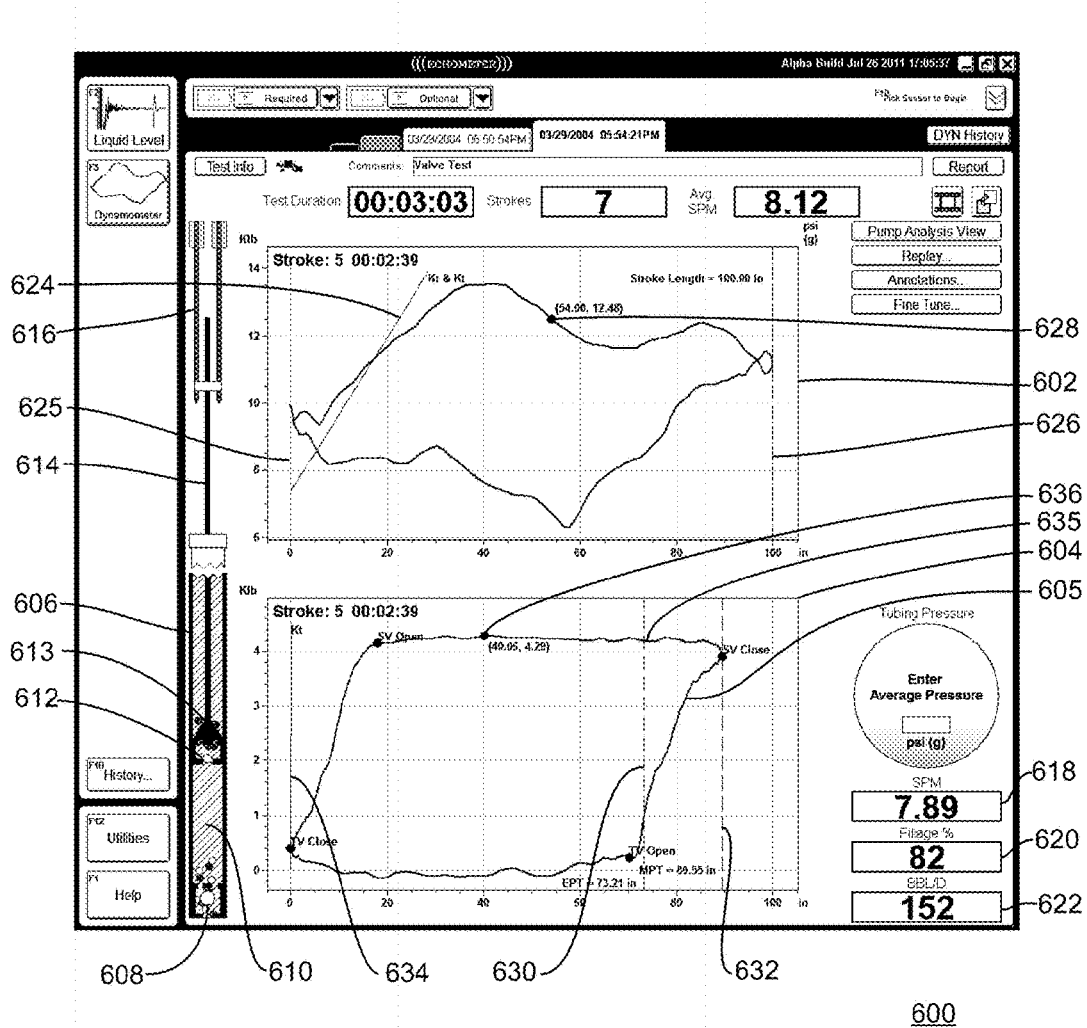
FIG. 15 is a real-time computer display screen of the surface card and pump card for a well under test according to an illustrative embodiment of the present invention.

Reference is directed to FIG. 15, which is a real-time computer display screen of the surface card and pump card for a well under test according to an illustrative embodiment of the present invention. The figure presents a screen capture like image of the "Cards View" screen 600 that presents the surface dynagraph 602 and the pump dynagraph 604. The Cards Screen 600 also presents an animated graphic of the well pump 606. There is also other information displayed, and that will be discussed hereinafter. The surface card 602 presents a real-time plot of load versus position of the polished rod, including a moving cursor 628 to show the instant real-time position and load. The maximum rod travel, 100" in this embodiment, is identified by a vertical line 626 on the surface card 602. In this embodiment, a rod and tubing stretch line, abbreviated Kr & Kt, 624 is presented. The pump card 604 presents a real-time plot 635 of load versus position for the rod at the down-hole pump plunger location. This plot presents a zero line 634, which matches the position of a zero line 625 on the surface card 602. The pump card 604 also shows a vertical maximum plunger (MPT) travel line 632 that is marked as 89.55 inches in this embodiment. Note that the polished rod travel is 100" while the pump travel is about 90 inches, and this is due to the effects of rod and tubing stretch during operation. The pump card 604 also presents an effective plunger travel (EPT) line 630, marked as 73.21 inches in this embodiment. This line illustrates the degree of gas compression in the pump chamber required to increase pressure to the level where liquid flows and the valves transition to begin pumping action. Stated another way, MPT minus EFT is the compression travel of the pump, which is 16.34 inches (89.55 minus 73.21) in this embodiment. It is noted that the displayed effective plunger travel line 630 is draw based on the performance data from the immediately previous stroke during real-time operation because a full set of data is not available to calculate this value until the end of each stroke.

The pump card 604 plot 635 also presents the stationary valve and traveling valve opening and closing points, which are indicated as dots, generally at the four corners of the plot 635, and labeled accordingly (SV Close, TV Open, TV Close and SV Open). As discussed earlier, these point are determined by differential pressure in the pump and through other means and estimations. The valve actuation points are determined by other means in other embodiments. In one embodiment, the traveling valve opening event is determined to be at the top of the plunger stroke. In another embodiment the traveling valve opening event id determined to be after plunger load has deceased 15% from its peak value. In another embodiment, the traveling valve closing event is determined be the plunger reaching its lowest position. In another embodiment, the stationary valve closing event is determined as the plunger in its highest position. Continuing in FIG. 15, as the pump operates and the test commences, the cursors 628 and 636 move about the plots and the user can visually study the dynamic operation in real-time. One interesting aspect realized in this viewing processes is that the pump card cursor appears to lag the surface card cursor, and this is due to the rod stretch effects produced in the wave equation calculations. To further enhance this visualization, the illustrative embodiment present an animated pump graphic 606 together with the card plots.

The animated pump graphic 606 in FIG. 15 illustrates the pump chamber 610 with the stationary valve 608 at the bottom, and the plunger 613 and traveling valve 612 stroking up and down in real time. The animated graphic 606 also illustrates the sucker-rod 614 and the bridle 616 at the surface level. The valves 608 and 612 are also animated and move between open and closed positions according to the data set used to draw the plot 635, and is therefore animated in synchronous with the plot and in real-time. The pump and chamber also present graphic depictions of the oil (black bubbles) and gas (white bubbles) moving within the cyclical operation, and these will be discussed further hereinafter. The card view screen 600 also presents other real-time information, including the production rate of the well in barrels per day 622, the fillage percentage of the pump chamber 602, which is based on the aforementioned gas compression, and the pumps cyclical rate 618 in strokes per minute. Other information on the cards view 600 is self-evident. In the illustrative embodiment, the pump fillage data is derived from the immediately previous stroke since the data for the current stroke is incomplete until the end of each stroke. On the other hand, in a replay mode of display, the pump fillage data from the current stroke is applied.

Figure 16:
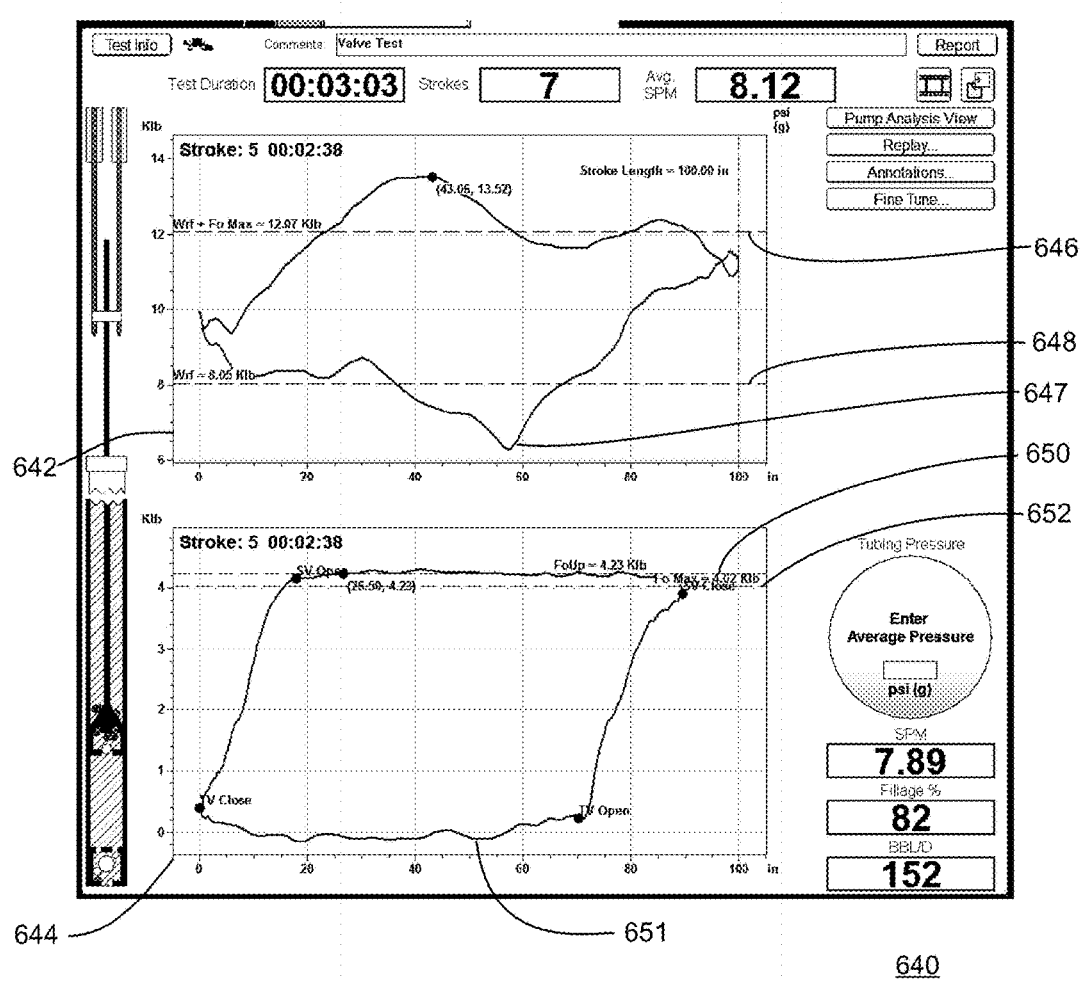
FIG. 16 is a real-time computer display screen of the cards view also including certain force information according to an illustrative embodiment of the present invention.

Reference is directed to FIG. 16, which is a real-time computer display screen of a cards view 640 also including certain force information according to an illustrative embodiment of the present invention. This view is very similar to the view from FIG. 15, however, a different set of annotations are presented. The illustrative embodiment is capable of calculating various loads within the pumping well, which are useful augmentations for more detailed analysis by the operator. In FIG. 16, the cards view screen 640 includes a surface dynagraph 642 with plot 647 that displays a horizontal line 648 indicating the weight of the rod, which is suspended from the pump jack, and which is 8.05 kips in this embodiment. This weight is derived from the well structural information. The surface card also presents a line 646, which is the sum of the weight of the sucker rod plus a calculated maximum upward force on the rod at the plunger. This is annotated on the card 642 as Wrf+FoMax and is 12.07 kips. FoMax is calculated from the structural well data and production data, and is equal to the weight of the column of well liquids in the tube that must be lifted by the plunger on the upstroke in the case where there is assumed to be zero chamber pressure.

The cards view 640 in FIG. 16 also includes a pump card 644 with a force versus position plot 651 for the rod at the pump plunger location. This card also includes a horizontal line 652, which represents the maximum upward force on the plunger. It is indicated to be FoMax=4.02 kips in the illustrative embodiment. As noted above, FoMax is calculated from the structural well data and production data, and is equal to the weight of the column of well liquids in the tube that must be lifted by the plunger on the upstroke in the case where there is assumed to be zero chamber pressure. The pump card 644 also presents a second horizontal line 650, indicating actual upward force at the pump plunger, and it is indicated to be FoUp=4.23 kips in the illustrative embodiment. FoUp is calculated as the rod load at the plunger location from the aforementioned wave equation. The difference between FoMax and FoUp is the chamber pressure assist pressure. In addition to the force related annotation presented in FIG. 15, the present invention offers the user a number of other annotation options.

Figure 17:
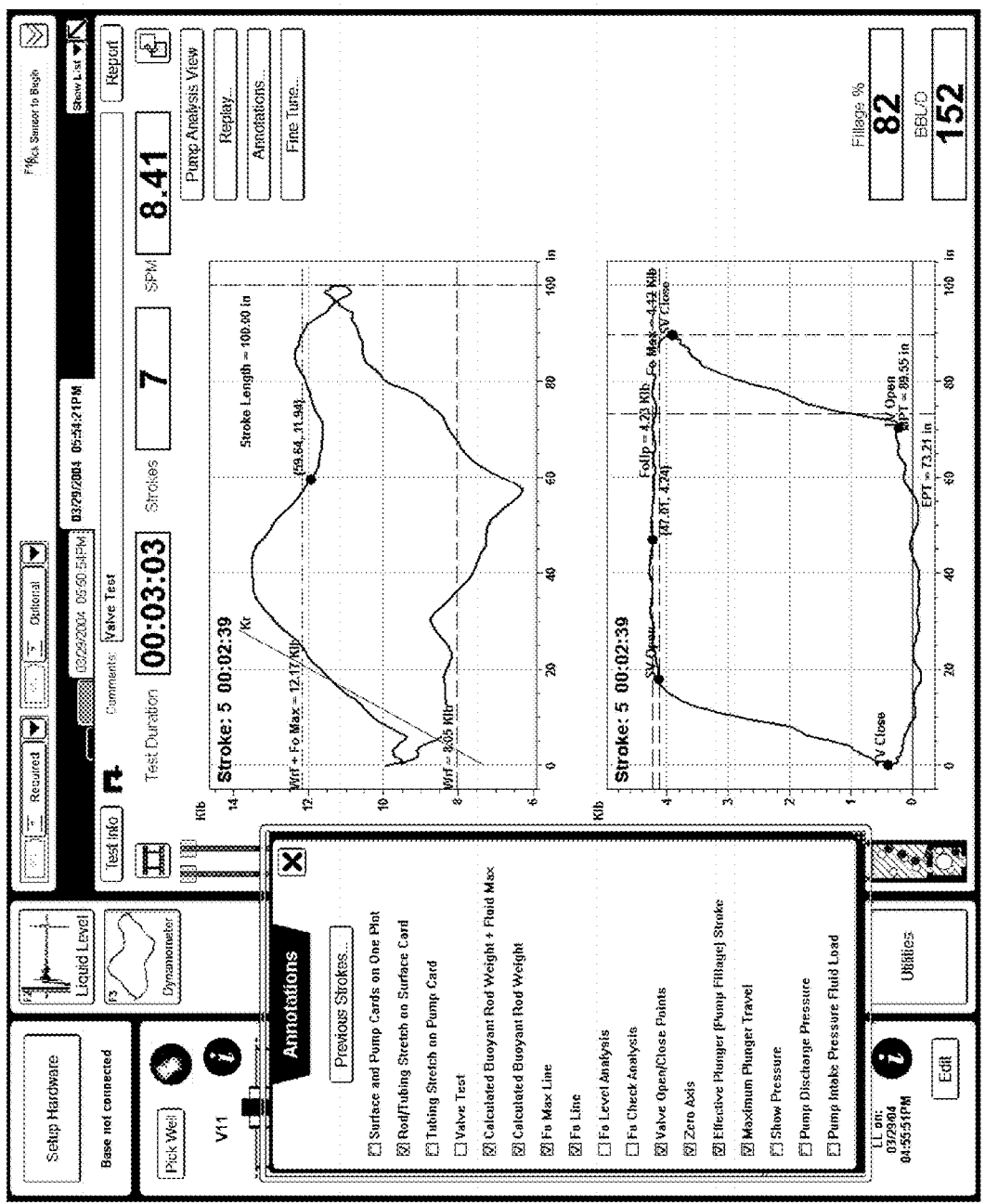
FIG. 17 is a real-time computer display screen of the cards illustrating the annotation options according to an illustrative embodiment of the present invention.

Reference is directed to FIG. 17, which is a real-time computer display screen of the cards illustrating the annotation options according to an illustrative embodiment of the present invention. Various arrangement of information can be presented in the illustrative embodiment, and the user has control of their selection, as well as certain annotations that may be added to the cards view screen, as seen in this FIG. 16. The annotation options include:
1) Placing the surface card and pump card on a single plot, sharing the vertical load axis.
2) Display rod and tubing stretch lines on the surface card.

3) Displaying a tubing stretch line on the pump card.
4) Calculated buoyant of weight plus fluid maximum load.
5) Calculated buoyant rod weight.
6) Fo Max Line.
7) Fo Line.
8) Valve open and close points.
9) Zero axis.
10) Effective plunger stroke.
11) Maximum plunger travel.
12) Pressures.
13) Pump discharge pressure.
14) Pump intake pressure.

Figure 18:
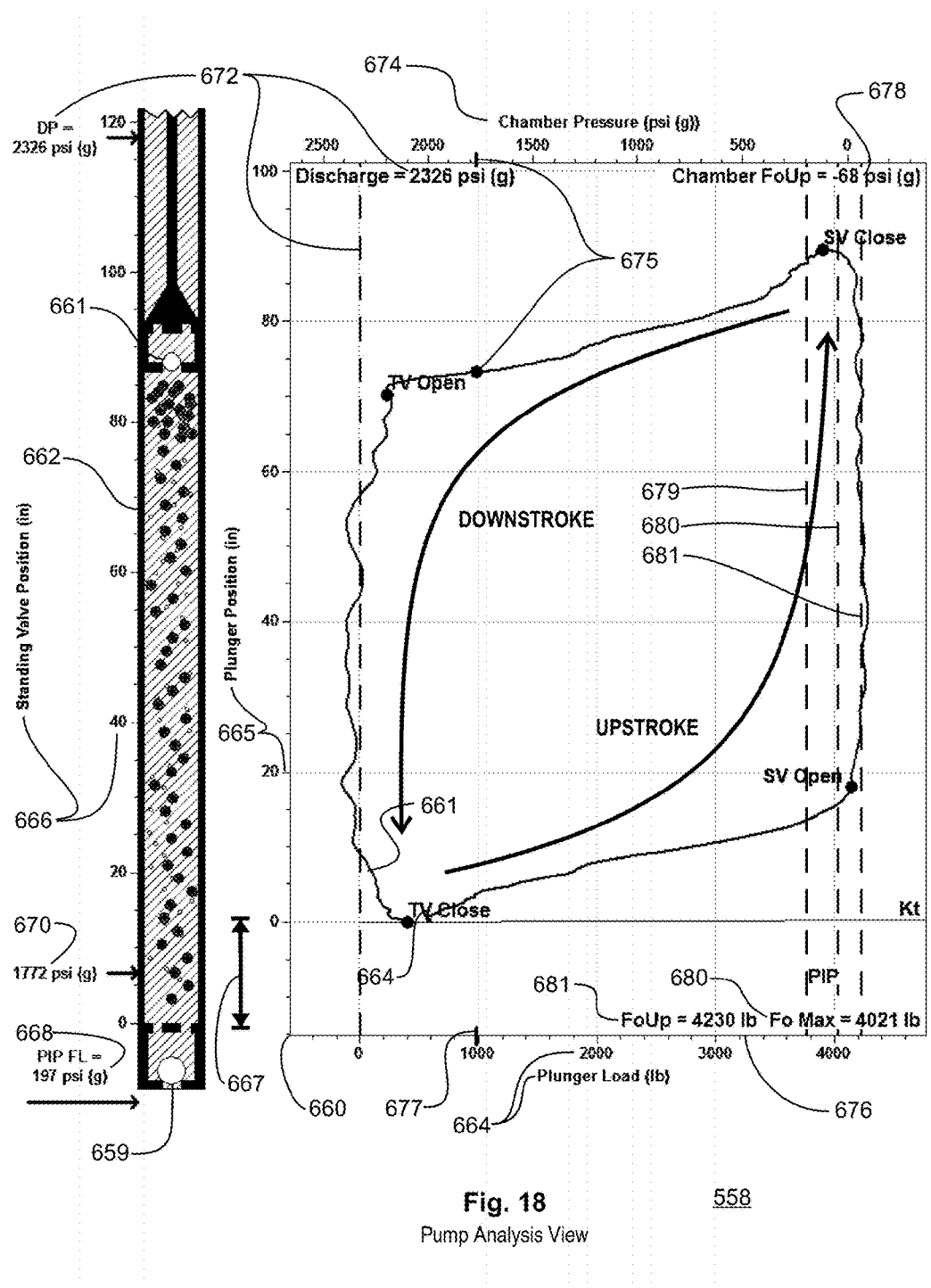
FIG. 18 is a real-time computer display screen of a pump analysis view for a well under test according to an illustrative embodiment of the present invention.

Reference is directed to FIG. 18, which is a real-time computer display screen of a Pump Analysis View for a well under test according to an illustrative embodiment of the present invention. The pump analysis view 558 consolidates a great deal of real-time data and analysis on the pump operation, including plunger position, plunger load, pump pressures, and other data. In addition, the same information can be recalled from prior real time test and displayed at various reproduction speeds for later detailed analysis. The display includes a graphical representation 660 with a plot 661 of pump action showing plunger load 664 across the lower horizontal axis, chamber pressure 674 along the upper horizontal axis, and plunger position 665 along the vertical axis. It is possible to accurately display the chamber pressure 674 and plunger load 664 to the proper scale because they are mathematically linearly and inversely related in the case where plunger chamber pressure is derived from plunger load and the known metrics of the pump in operation. The display also presents an animated graphic of the pump 662. The pump animation 662 displays the movement of the plunger 661 with traveling valve and the pump inlet 659 with stationary valve. Note that there is a length scale 666 for the pump graphic 662, with the stationary valve ("standing valve") position set to the zero reference on the scale. Thus, the position of the plunger can be compared to the stationary valve resting as it moves up and down in the animation. Also note that stretch of the tubing will be apparent in the animation because the scale 666 remains stationary as the position of the stationary valve 659 moves up and down with tubing stretch. The plunger position scale 665 of the graphical plot 660 is set to zero at the lowest position in the plunger travel. The difference in the zero position of the standing valve scale 666 and the plunger position scale 665 is highlighted in the drawing by arrow 667. This distance 667 represents the clearance, at rest, between the plunger 661 and the stationary valve 659 when the pump is at the bottom of the stroke. During real-time animation of the plunger movement and the tubing stretch, clearance and pump cyclical operation become remarkably clear in the display format.

The plot 660 in FIG. 18 also illustrates the standing valve and travelling valve open and close points along the real time trace 661, and the cyclical movement of the instant position cursor 675 is oriented with the UPSTROKE and DOWNSTROKE arrows added to the drawing figure. Note that the cursor 675 is also referenced along the chamber pressure scale 674, and thus highlights the changing chamber pressure as the pump operates. The user may optionally enable the display of other operational information on the pump analysis view 558, some of which are illustrated in FIG. 18. For example, a discharge pressure reference line 672 can be displayed along with numerical representation on the plot 660 and adjacent to the pump graphic 662. Another pressure data point is the pump inlet pressure ("PIP"), which can be numerically presented 668 adjacent to the pump inlet 659, and also as a vertical line plot 680 on the graph 660. Other pressure data can also be presented, for example the chamber force up pressure is numerically displayed 678. Force reference data can also be presented. The force up 681 is displayed both numerically and as vertical line on the graph 660. So too is the force maximum line 681. Additionally, other factors discussed elsewhere herein with respect to he pump card can be presented. The tubing stretch factor line "Kt", for example.

The animated pump graphic 662 also illustrates proportionally sized oil and gas bubbles. The animated graphic 662 also combines the pump inlet pressure 668, the pump chamber pressure 670, and the pump discharge pressure 672. With this presentation, the user can see the entire pump operation in a quick glance, and monitor the pump plunger movement in real time, while monitoring the changing pressure and changing forces as they occur, and obtain a dynamic sense of the movement in real-time. This makes it readily apparent as to how the pump is operating and it becomes very noticeable when there are indications of problems in the pump dynamics. With respect to pump operation, pressure inside the pump chamber is partially controlled by plunger position and compressibility of the gas-liquid mixture. Compressibility increases as the input gas to liquid ratio increases and as gas evolves from the liquid. Comparison of the chamber pressure with the pump intake and discharge pressures determines the position of the plunger when the traveling and stationary valve change status from closed to open and vice versa. This action is plainly visible while monitoring the cyclical operation of the plot 661 and the animated graphic 662 in the pump analysis view 558 of FIG. 18. Furthermore, the pump forces and pressure are derived, in part, from the surface polished rod test data. In the illustrious embodiment, simultaneous with the acquisition of load and acceleration at the surface, recording the variation of tubing head pressure as a function of time or of position of the polished rod also occurs. And, the tubing head pressure information is utilized to generate a more accurate calculation of plunger load and position.

Figure 19:
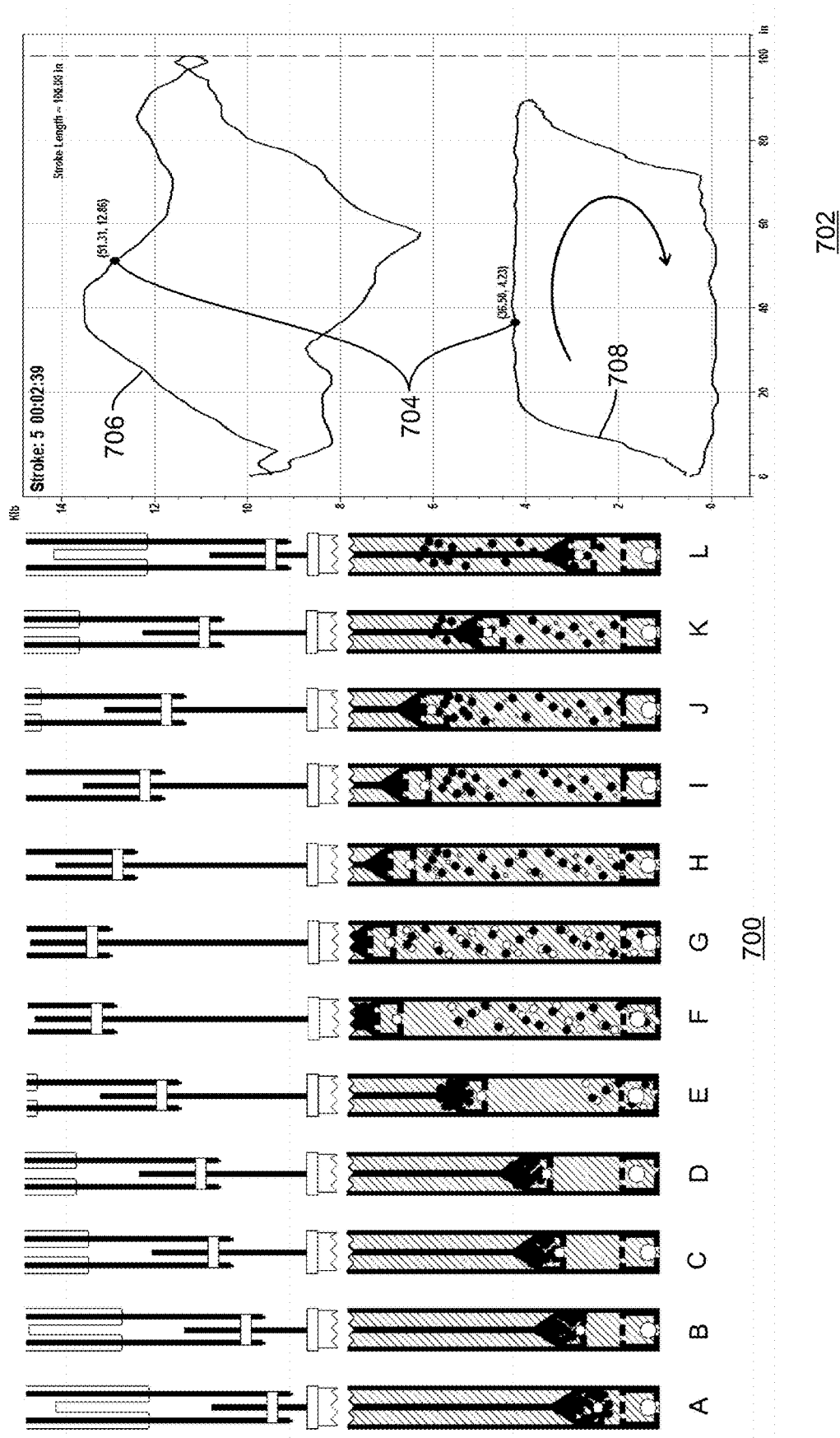
FIG. 19 is a time-segmented presentation of real-time pump animation for a well under test according to an illustrative embodiment of the present invention.

Reference is directed to FIG. 19, which is a time-sequenced presentation of real-time pump animation for a well under test according to an illustrative embodiment of the present invention. FIG. 19 presents a combined surface card and pump card plot 702 and a sequence of pump animations 700 that are labeled with letters "A" through "L". The pumps sequences illustrate the progression of the pump animation over time, which corresponds to the cursor 704 on the surface plot 706 and the pump plot 708 in the cards view 702. During acquisition of a real-time load and position points, represented by the cursor points 704, the cursors are moving in real time on both cards. At the same time, the system generates the animated pump graphic 700 and presents the movement of the plunger corresponding to the pump card position data, and the movement of the bridle according to the surface card position data. It also animates the movement of the stationary valve, "SV" and the travelling valve "TV", and the movement of well fluids, with oil presented as black bubbles and gas presented as while bubbles, both of which circulate within the water portion of the well fluids. The animation sequence will now be discussed.

Sequence 'A' show the plunger at the bottom of its stroke with the SV closed and the TV closed. The plunger is drawn upward in sequences 'B' and 'C', however, the chamber pressure has not yet dropped low enough to open the SV. Although the fluids above the plunger are being lifted upward and there is substantial loading on the plunger. At sequence 'D', the chamber pressure has dropped low enough that the pump inlet pressure forces the SV to open, and well fluids can begin flowing into the chamber. During sequences 'E' and 'F', the plunger continues upward and the well fluids continue to enter the chamber, generally including bubbles of oil and gas, and the chamber pressure remains close to the pump intake pressure. The pump discharge pressure and the forces on the rod are high during these sequences. At sequence 'G', the plunger has just passed the upward limit of its travel and begins to move downward, and the SV will close when the chamber pressure becomes equal to or greater than the pump intake pressure. The pump chamber is now full of a fresh charge of well fluids, and the chamber pressure is still fairly low so the bubbles of gas are near their largest volume. In sequences 'H' and 'I', the plunger moves downward and the pressure in the chamber increases, however the TV remains closed because the chamber pressure is still less than the discharge pressure. The gas bubble compress, and the system reduces their diameter proportionally. At sequence T, the gas has become fully compressed and the chamber pressure exceeds the discharge pressure so the TV opens and the chamber fluids begin flowing out the pump discharge. During sequences 'K' and the chamber fluids continue to flow out the discharge until the plunger reaches the bottom of its stroke, at which time the TV closes and the sequence repeats back to sequence 'A'. The foregoing description applies to a normally operating well with properly operating valves.

Because of the wealth of information in the illustrative embodiment, and the unique manner in which is it presented in the combined cards view and pump animation sequences, the operator can see in real time what is happening inside the pump, how much fluid is being displaced, how valves are functioning and the dynamics of the rods that cause oscillation and delays of the plunger motion. Immediate indication of pump displacement and rod loading answers the main questions regarding pumped fluid and equipment loading. The operator can view detailed quantitative analysis when needed and has powerful software tools for refining the analysis if desired. Furthermore, using the computed pump chamber pressure versus plunger position to calculate the relative volumes of gas and liquid present in the pump chamber using the PVT properties of the fluids based on composition of the fluids and other physical properties to estimate the material throughput at the pump provides a complete picture as to the down-hole pump operation.

Figure 20:
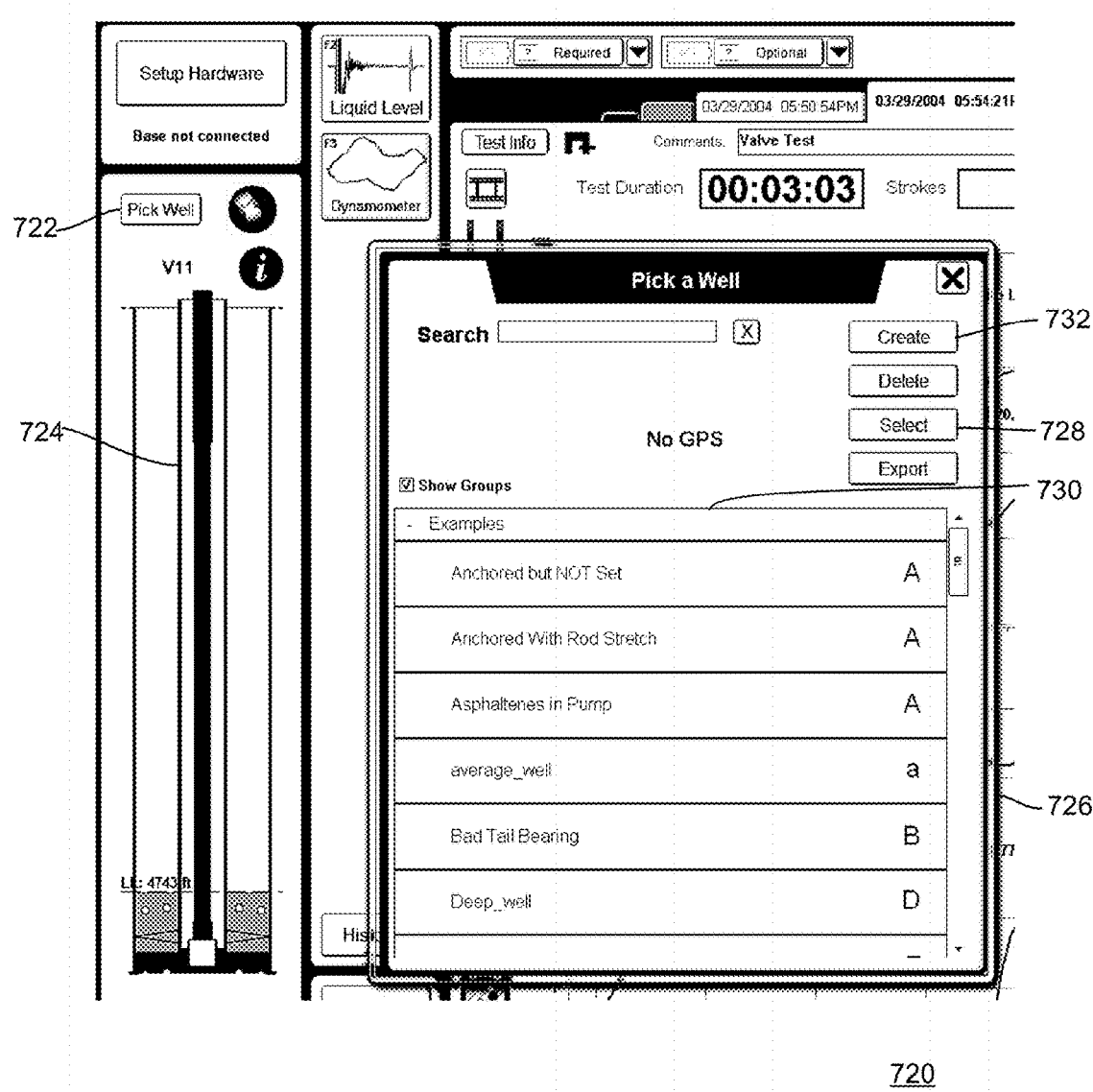
FIG. 20 is a computer display screen of for well database selection according to an illustrative embodiment of the present invention.

Reference is directed to FIG. 20, which is a computer display screen of for well database selection according to an illustrative embodiment of the present invention. The illustrative embodiment system provides a large database for storing plural well profiles for structural and production information. User can select from preconfigured profiles, input their own profiles, or import profiles from other software applications. FIG. 20 is a partial screen capture 720 of the "Pick Well" interface in the illustrative embodiment. The system provides a "Pick Well" selector 722, which brings up a pop-out menu 725 offering the user several choices for proceeding. As a preliminary note, the host screen 720 presents a schematic 724 of the presently selected well, which provides the user with a quick visual of what the well configuration entails. The pop-out window 726 enables the user plural choices including creating a new well profile 732 and selecting 728 an existing profile from the drop-down menu 730 linked to the database of well profiles. Once a well is selected, it may be updated and saved, copied, exported and so forth by the user. Once a well is selected, the user is presented with specific database fields for review or editing.

Figure 21:
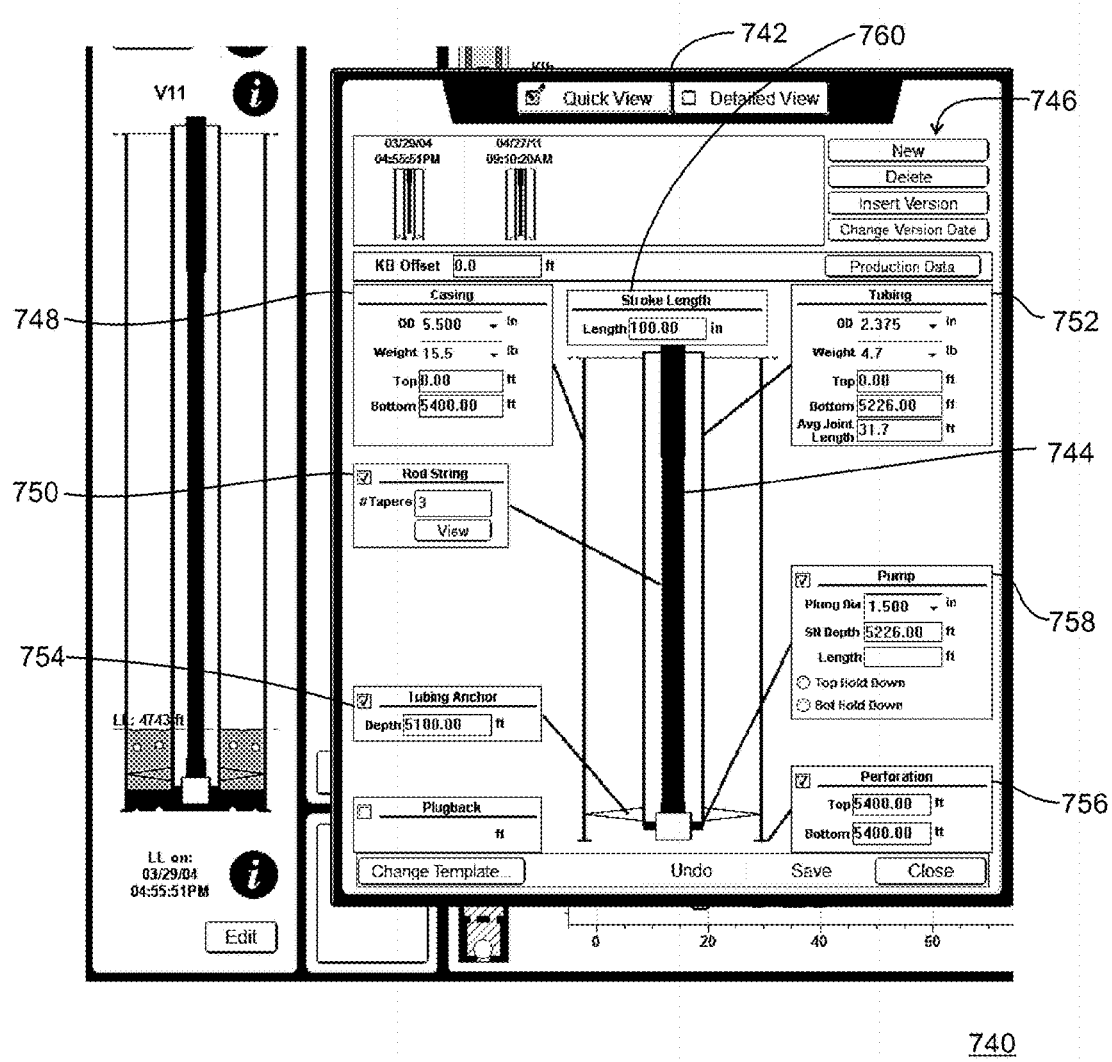
FIG. 21 is a computer display screen for well structural information entry and editing according to an illustrative embodiment of the present invention.

Reference is directed to FIG. 21, which is a computer display screen 740 for well structural information entry and editing according to an illustrative embodiment of the present invention. The well configuration pop-out menu 742 of FIG. 20 is enable in the Pick Well pop-out discussed in FIG. 20. FIG. 21 presents a portion of the structural information for the presently selected well. If the well is pre-configured in the database, the user has an option to amend the data fields. If it is a new well, the user can enter the requisite information. The pop-out 742 presents a schematic 744 for the well, which provides a quick view of the well's general configuration. Plural data entry boxes are provided for data presentation and update. Among these are a casing specification, including casing diameter, casing weight per foot, and casing depth information. There is separately provides a casing perforation data entry box 756, which includes the top and bottom depths of the perforated length of the casing. There is a tubing string data box 752, which includes tubing diameter, weight per foot, depth ranges, and joint distance. A rod string data box is provided that displays the number of rod diameter tapers, and which enable further access to more specific details of the rod structure. A pump data box 758 includes pump diameter, depth, length, and pump hold-down information. A tubing anchor box 754 includes the depth of any tubing string hold-downs in the well structure. And, a stroke length box 760 includes the length of the surface unit cyclical stroke. Finally, there are a set of buttons 746 for saving, deleting and changing the present database record.

Figure 22:
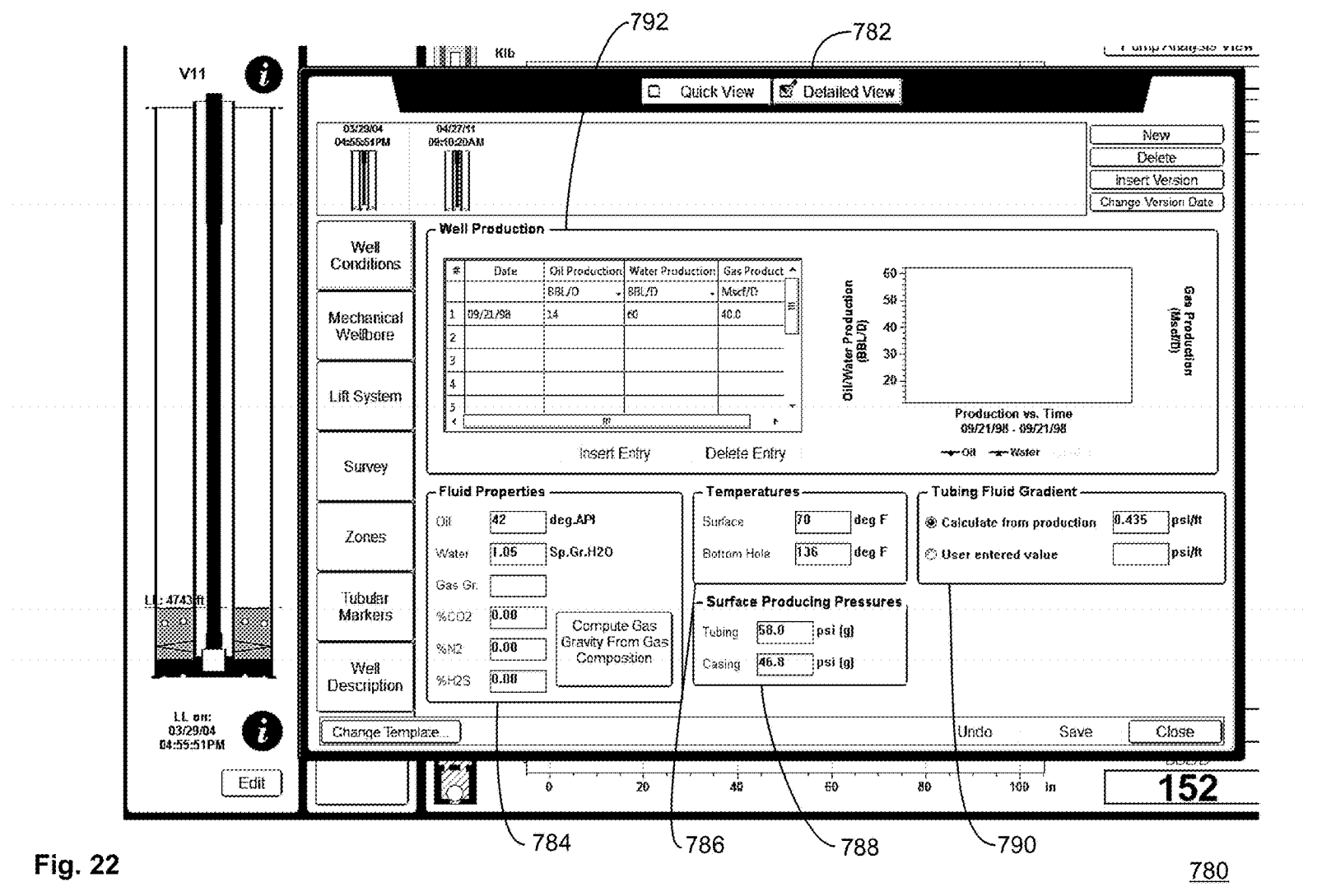

Reference is directed to FIG. 22, which is a computer display screen 780 for well production information according to an illustrative embodiment of the present invention. This well screen provides production information about a presently selected well. It is accessed from the Pick Well screen discussed regarding FIG. 20. In FIG. 22, the well production data 792 is presented. This includes the production of water, oil and gas, which naturally establishes the ratios between each. This information can be recalled from prior production, or the data can be entered by the user based on otherwise available information. A fluid properties section 784 includes oil gravity (in degrees API), water specific gravity, gas gravity, and percentages of certain trace elements. The well temperatures are includes a another box 786. Surface pressures are presented in another box 788 for both the casing and the tubing string. This is useful information in the case a pressure transducer is not utilized in a current test, because it becomes the source of temperature information in the calculations. A tubing fluid gradient box 790 includes a factor for pressure increase per foot of filled tubing, which is used to calculate the pump discharge pressure in the calculations. The tubing gradient can either be a preset value, or it can be deduced from the fluid production properties.

Figure 23:
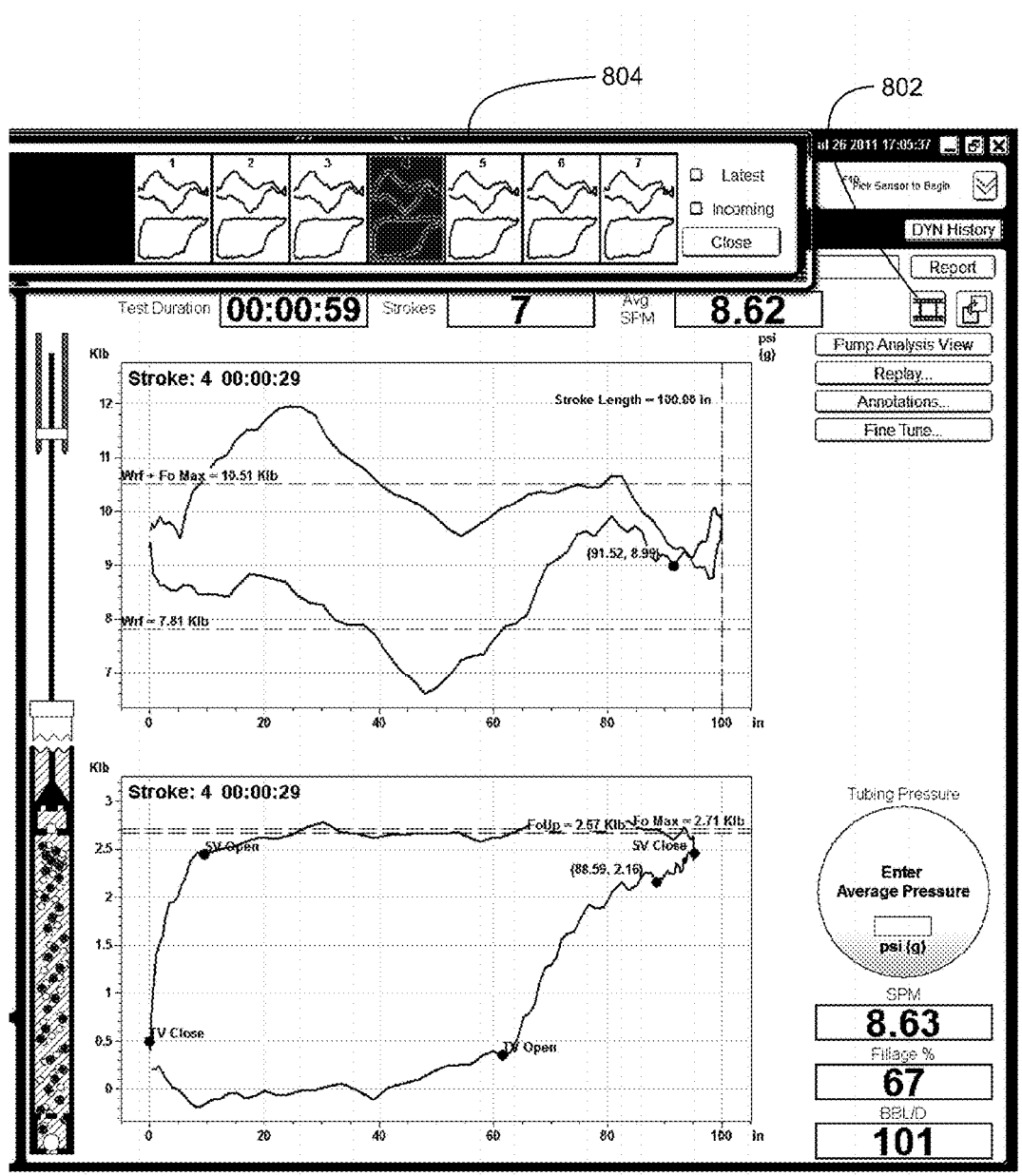
FIG. 23 is a computer display screen of the cards view also illustrating prior test data selection according to an illustrative embodiment of the present invention.

Reference is directed to FIG. 23, which is a computer display screen 800 of the cards view also illustrating prior test data selection according to an illustrative embodiment of the present invention. As was briefly discussed hereinbefore, the illustrative embodiment system saves real-time test data in a database on a stroke-by-stroke basis, and this information can be recalled and displayed by the user. This is beneficial because comparing current real-time performance with past tests is instructive on trends in the well performance and can often times predict upcoming potential for failure that might be preemptively corrected. Thus, in FIG.

23, the cards view screen 800 provides an option to select 802 prior production data tests sets on a stroke-by-stroke basis. When the filmstrip-style button 802 is selected, a pop-out menu 804 is presented that shows a string of miniaturized cards views for the user to select from. Note that these miniaturized cards views are not random, rather, they are depictions from the actual data in the database. This is beneficial because it assists the user in selecting a particular stroke record from the plural records. In addition, where the database record includes one or more strokes of data that represent a valve test, then this "film strip" of cards views will display an indication that there was a valve test.

Figure 24:
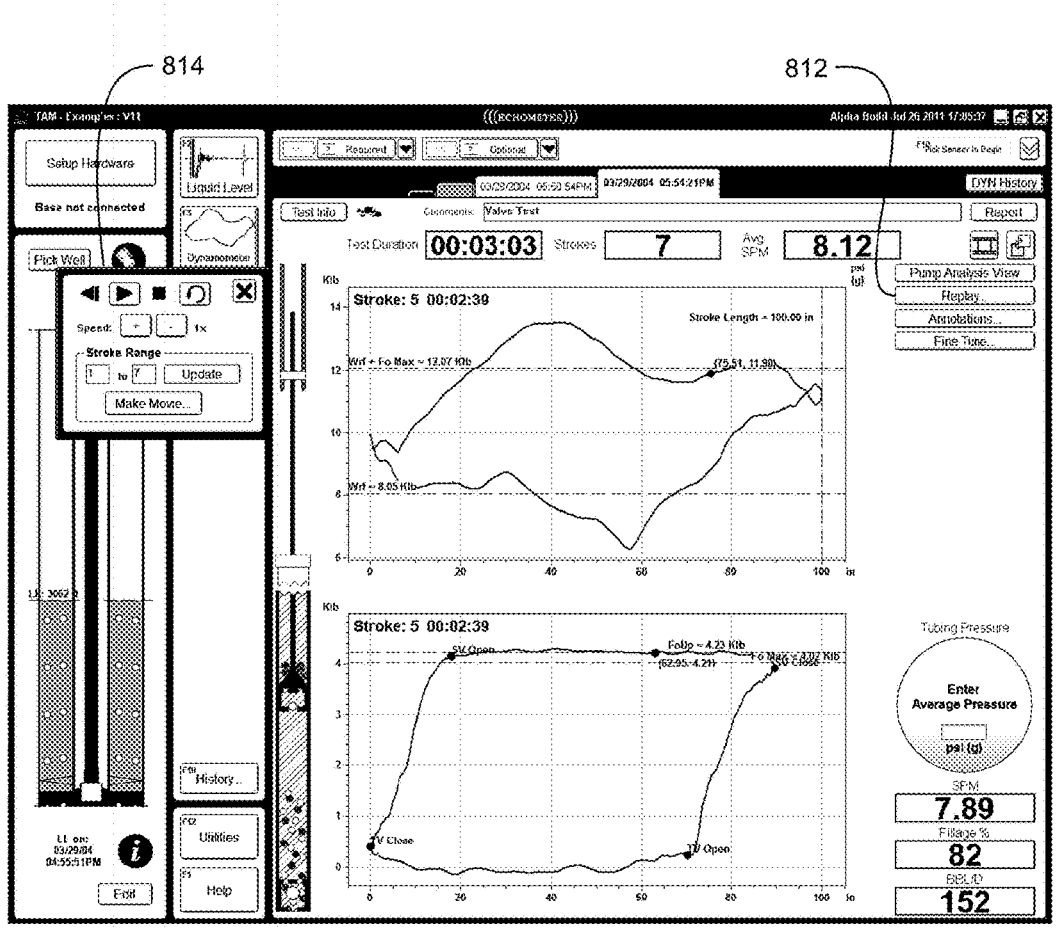
FIG. 24 is a computer screen display for animated playback of prior test data according to an illustrative embodiment of the present invention.

Reference is directed to FIG. 24, which is a computer screen display 810 for animated playback of prior test data according to an illustrative embodiment of the present invention. As was discussed regarding FIG. 23, the system of the illustrative embodiment saves real-time data test sets in a database indexed by well, and enables that data to be recalled for utilization by a user. In FIG. 24, the user has the ability to select a "Replay" button 812. This action causes a replay pop-out box 814 to appear. This box contains familiar icons for rewind, play stop, pause and so forth. Bt selecting these buttons, the user can direct the system to replay the stored well test data for review and comparison with current real-time testing. The test data can be replayed at real-time speeds or at faster or slower speeds to assist in the analysis process. The system the presents the previously discussed cards view, including the pump animation features and replays them in the same manner of live test data. This includes all of the features previously discussed. In addition, the replayed data set can be recorded as a standardized media file, such as a Windows .mov file, which can be exported from the system and communicated to remote locations. This is particularly beneficial because the information can now be presented on a personal computer that doesn't run the specialized software of the illustrative embodiment.

Figure 25:
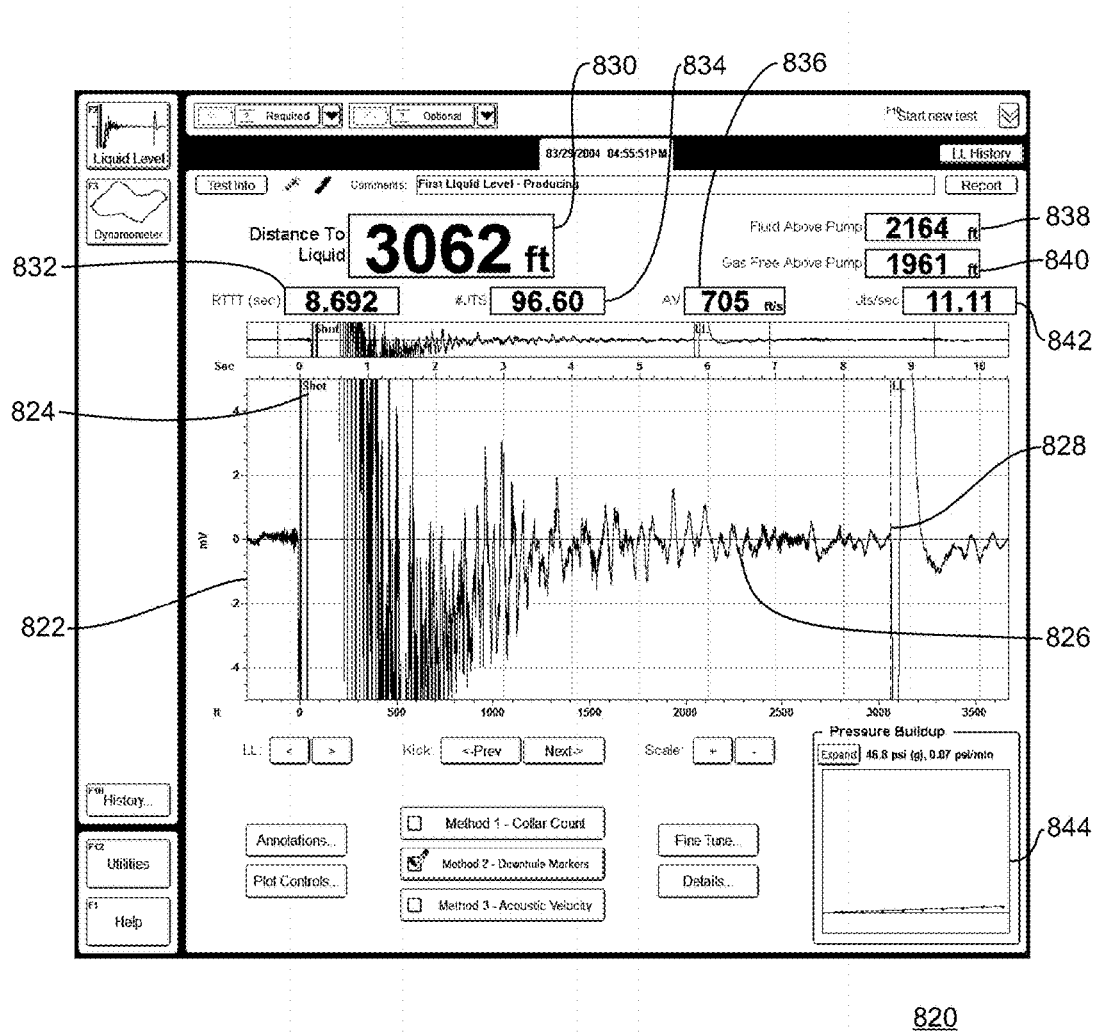
FIG. 25 is a computer display screen showing an echo meter test according to an illustrative embodiment of the present invention.

Reference is directed to FIG. 25, which is a computer display screen 820 showing an acoustic liquid level meter test according to an illustrative embodiment of the present invention. As was discussed earlier, the acoustic liquid level meter functions by releasing a burst of compressed gas as a shock wave into the well casing. A sensitive microphone listens to the return echo signal, which is comprised of noise, return echoes from the collar joints on the tubing string, and a larger return echo from the surface of the liquid in the well casing, which is the primary item of data utilized in the systems of the illustrative embodiment. The acoustic echo signal is processed in manners disclosed in the prior art, and in additional manners taught by the present invention. It should be noted that the acoustic liquid level meter test can be conducted during operation of the dynamometer test without interruption. This is advantageous for the operator because lest time is required to conduct a full well test. The display screen 820 of FIG. 24 illustrates the data presented to the user following an acoustic liquid level meter test. A plot 822 of echo signal 826 versus time is written to the display. The instant in time of the acoustic liquid level meter shot 824 is marked with a vertical line. The signal with noise is plotted, and some of the echo data is visually perceptible, such as the earlier collar reflections, and in particular, the return echo from the liquid surface 828 is obvious, and is marked with a vertical line. This data is processed to provides specific numerical information to the user.

The numerical data presented on the display 820 in the acoustic liquid level meter test includes the distance to liquid 830, which is 3064 feet in this example. The total time for the return echo 832 is presented, which is 8.692 seconds. The number of collar joints is calculated, and display 834, and is 96.6 collars in this example. The average acoustic velocity is calculated 836, and is 705 meters per second here. The rate of joint return echoes is calculated 842, and is 11.11 joints per second here. Actually, the velocity and rate of returns change gradually as the pressure and density of the column of gas in the well built-up under force of gravity. This pressure build-up is plotted 844 on the display. Other functions and features of the acoustic liquid level meter test will also be discussed.

Figure 26:
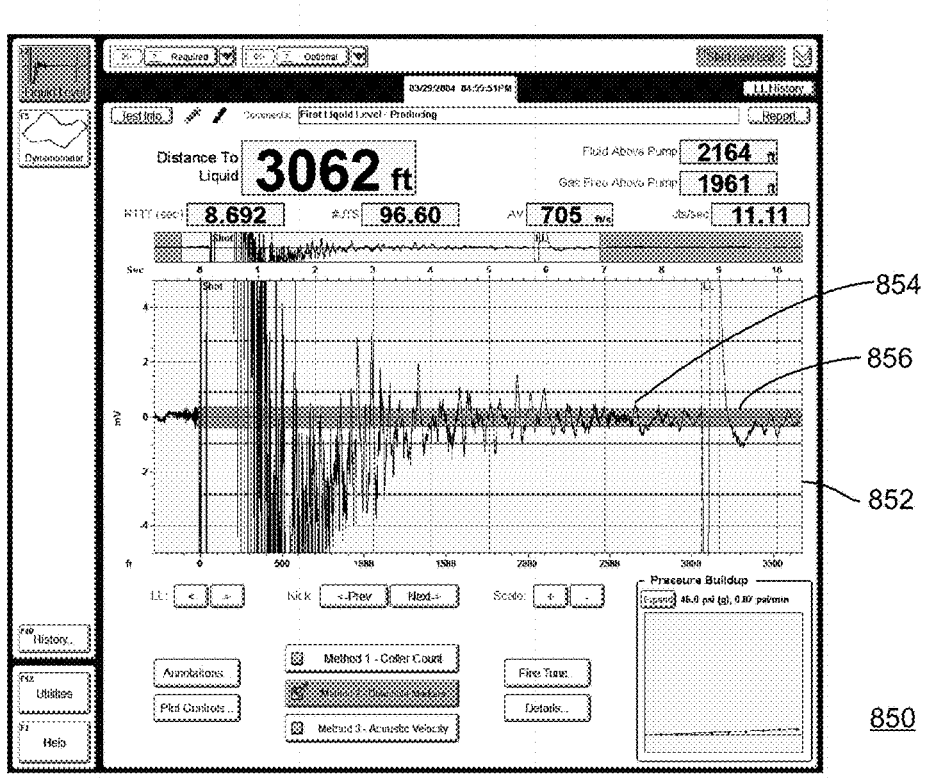
FIG. 26 is a computer display screen showing an echo meter test with superimposed well casing graphic according to an illustrative embodiment of the present invention.

Reference is directed to FIG. 26, which is a computer display screen 850 showing an acoustic liquid level meter test with superimposed well casing graphic according to an illustrative embodiment of the present invention. The acoustic liquid level meter plot 852 presents the echo signal 854 versus time. In the illustrative embodiment, the user may select to have the program superimpose a graphic of the well bore profile 856 as a view aid. This is also instructive in orienting the surface of the well, the liquid level and other physical well attributes.

Figure 27:
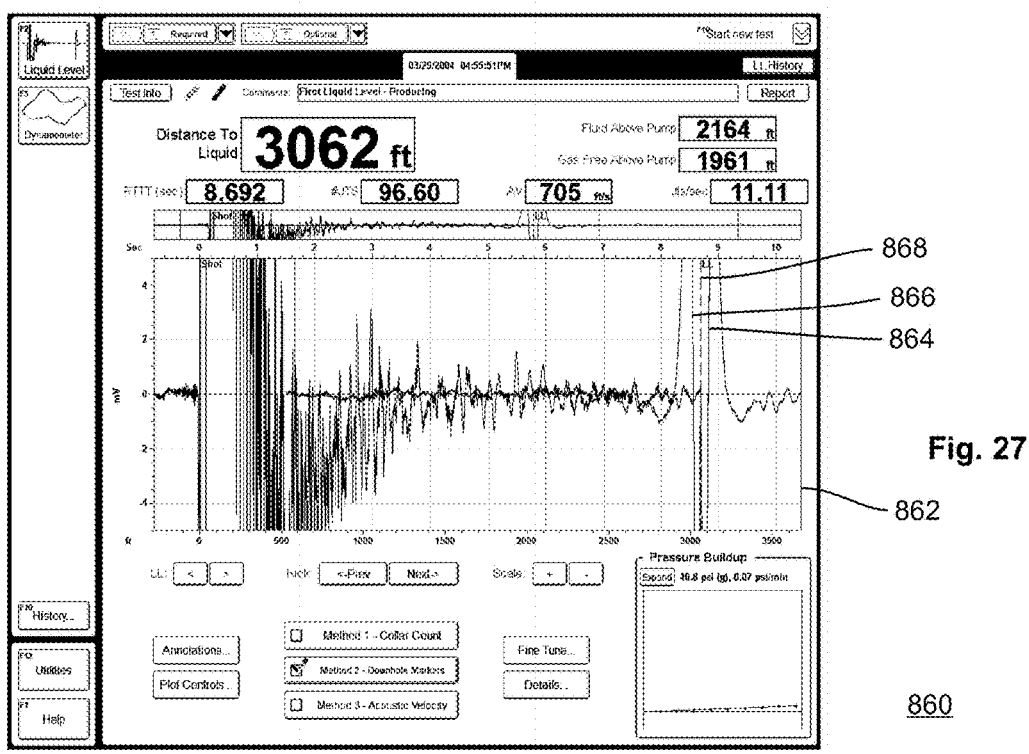
FIG. 27 is a computer display screen showing an echo meter test with mirrored echo trace presentation according to an illustrative embodiment of the present invention.

Reference is directed to FIG. 27, which is a computer display screen 860 showing an acoustic liquid level meter test with mirrored echo trace presentation according to an illustrative embodiment of the present invention. It is not unusual for the noise component in a acoustic liquid level meter return echo plot to confuse the essential data, particularly when it is viewed on a computer display screen. In FIG. 26, the echo return plot 862 includes a plot of the return echo 864. The user is able to select a plot of an inverted echo signal 866. This is a good aid in identifying the liquid level line 868 because of the nature of the signal. The liquid level will align clearly and distinguish it from other noise, which occurs randomly in the return echo.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of real-time utilization of performance data by a processor, which is associated with a pump lifting well fluids above a liquid level in a casing of a subterranean well through a tube to a surface level, the pump having a chamber with a fluid inlet that is gated by a stationary valve, and having a plunger slidably engaged with the chamber, the plunger having a fluid outlet gated by a traveling valve that is coupled to deliver well fluids to the tube, the plunger reciprocated to vary the displacement of the chamber by a rod extending upward to a cyclical drive unit at the surface, the method comprising the steps of:

positioning a transducer unit proximate the rod at the surface level for gathering acceleration and strain data of the rod;

calculating, in real time, a sequence of rod position data samples and rod load data samples as a function of said acceleration and strain data;

calculating, in real time, a sequence of plunger position data points and plunger load data points using wave equation modeling, which corresponds to cyclical operation of the rod at the plunger level;

calculating, by the processor, an inlet pressure at the fluid inlet to the pump as a function of the pump depth and density of well fluids in the casing;

calculating, by the processor, a discharge pressure at the fluid outlet from the pump as a function of the pump depth and density of well fluid in the tube;

calculating, in real-time, a sequence of pump chamber pressure data points as a function of said sequence of plunger load data points;

calculating, in real-time, stationary valve actuation events by comparing an inlet differential pressure between said pump inlet pressure and said camber pressure;

calculating, in real-time, traveling valve actuation events by comparing an outlet differential pressure between said pump outlet pressure and said camber pressure, and delivering, in real-time, said stationary valve actuation events and said traveling valve actuation events to a valve actuation data output.

2. The method of claim 1, and wherein:

said stationary valve actuation events include stationary valve opening events and stationary valve closing events, and said traveling valve actuation events include traveling valve opening events and traveling valve closing events.

3. The method of claim 1, and wherein the step of positioning a transducer unit proximate the rod at the surface level comprises clamping a transducer unit to the rod at the surface level to gather acceleration and strain data of the rod.

4. A method of real-time utilization of performance data by a processor, which is associated with a pump lifting well fluids above a liquid level in a casing of a subterranean well through a tube to a surface level, the pump having a chamber with a fluid inlet that is gated by a stationary valve, and having a plunger slidably engaged with the chamber, the plunger having a fluid outlet gated by a traveling valve that is coupled to deliver well fluids to the tube, the plunger reciprocated to vary the displacement of the chamber by a rod extending upward to a cyclical drive unit at the surface, the method comprising the steps of:

positioning a transducer unit proximate to the rod at the surface level for gathering acceleration and strain data of the rod;

calculating, in real time, a sequence of rod position data samples and rod load data samples as a function of said acceleration and strain data;

calculating, in real time, a sequence of plunger position data points and plunger load data points using wave equation modeling, which corresponds to cyclical operation of the rod at the plunger level;

calculating, in real-time, stationary valve actuation events as a function of said plunger load data points;

calculating, in real-time, traveling valve actuation events as a function of said plunger load data points, and delivering, in real-time, said stationary valve actuation events and said traveling valve actuation events to a valve actuation data output.

5. The method of claim 4, further comprising the steps of:

conducting said calculating stationary valve actuation events and said calculating traveling valve actuation events in a manner so as to distinguish when a valve test is performed without interrupting said obtaining a sequence of rod position data samples and rod load data samples, and said calculating a sequence of plunger position data points and plunger load data points processes.

6. The method of claim 4 wherein the step of positioning a transducer unit proximate the rod at the surface level comprises clamping a transducer unit to the rod at the surface level to gather acceleration and strain data of the rod.

7. The method of claim 4, further comprising the steps of:

displaying, in real-time, a graphical representation of said sequence of rod position data samples and said sequence of rod load data samples on a graphical format surface card, and displaying indicators, in real-time, of said a stationary valve actuation events and said traveling valve actuation events on said graphical format surface card.

8. The method of claim 4, further comprising the steps of:

displaying, in real-time, a graphical representation of said sequence of plunger position data points and said sequence of plunger load data points on a graphical format pump card, and displaying indicators, in real-time, of said a stationary valve actuation events and said traveling valve actuation events on said graphical format pump card.

9. The method of claim 4, further comprising the steps of:

generating a graphical representation of the pump including the chamber and the plunger;

animating the movement of said plunger according to said plunger position data points;

generating a graphical representation of the stationary valve and the traveling valve on said graphical representation of the pump, and animating movement of the stationary valve and the traveling valve according to said a stationary valve actuation events and said traveling valve actuation events.

10. The method of claim 4, and wherein the well fluids have known physical properties, including gas and liquid portions, the method further comprising the steps of:

calculating, in real-time, a sequence of pump chamber pressure data points according to said sequence of plunger load data points;

determining a ratio of a gas portion to a liquid portion in the well fluids;

calculating, in real-time, volumetric compression data points of said gas portion within the pump chamber, and delivering, in real-time, said volumetric compression data points to a compression ratio data output.

11. The method of claim 10, and wherein:

said gas portion comprises hydrocarbon gas compounds, and said liquid portion comprises a hydrocarbon liquid compounds portion and a water portion.

12. The method of claim 11, further comprising the steps of:

calculating an effective plunger stroke factor by scaling said sequence of plunger position points with said volumetric compression data points, thereby resulting in the effective fluid displacement of the pump chamber.

13. The method of claim 12, further comprising the step of:

displaying said effective plunger stroke factor in a graphical format.

14. The method of claim 13, further comprising the steps of:

calculating the pump liquid throughput in accordance with said effective plunger stroke factor, including proportions in accordance with said hydrocarbon liquid compounds portion and said water portion, and calculating the pump gas throughput in accordance with said volumetric compression data points of said gas portion.

15. The method of claim 12, further comprising the steps of:
generating a graphical representation of the pump including the chamber and the plunger;
animating the movement of the plunger according to said plunger position data;
graphically representing said gas portion as a proportionally sized gas area and graphically representing said hydrocarbon liquid compounds portion as a proportionally sized oil area within the camber of the pump, and
animating the movement of said gas portion and said hydrocarbon liquid compounds portion within the pump.

16. The method of claim 15, further comprising the steps of:
varying the size of said proportionally sized gas area in accordance with said volumetric compression data points, thereby animating the compression of the said gas portion during cyclic operation of the pump.

17. A system of real-time utilization of performance data by a processor, which is associated with a pump lifting well fluids above a liquid level in a casing of a subterranean well through a tube to a surface level, the pump having a chamber with a fluid inlet that is gated by a stationary valve, and having a plunger slidably engaged with the chamber, the plunger having a fluid outlet gated by a traveling valve that is coupled to deliver well fluids to the tube, the plunger reciprocated to vary the displacement of the chamber by a rod extending upward to a cyclical drive unit at the surface, comprising:
a processor;
a sensor assembly positioned proximate to the rod at the surface level, to obtain, and forward to said processor in real time, acceleration and strain data of the rod, and wherein
said processor is programmed to calculate a sequence of rod position data samples and rod load data samples as a function of said acceleration and strain data, and wherein
said processor is programmed to calculate, in real time, a sequence of plunger position data points and plunger load data points using wave equation modeling, and as a function of said sequence of rod position data samples and said rod load data samples;
and wherein said processor is programmed to calculate, in real-time, stationary valve actuation events as a function of said plunger load data points;
and wherein, said processor is programmed to calculate, in real-time, traveling valve actuation events as a function of said plunger load data points, and
and wherein, said processor delivers, in real-time, said stationary valve actuation events and said traveling valve actuation events to a valve actuation data output.

18. The system of claim 17, and wherein:
said processor calculates said stationary valve actuation events and calculates said traveling valve actuation events in a manner so as to distinguish when a valve test is performed without interrupting said sensor assembly gathering said sequence of rod position data samples and said rod load data samples.

19. The system of claim 17 wherein said sensor assembly includes a polished rod transducer clamped to the rod for collecting said acceleration data.

20. The system of claim 17, further comprising:
a display, and wherein
said processor displays on said display, in real-time, said sequence of rod position data samples and said sequence of rod load data samples as a graphical format surface card, and wherein
said processor displays on said display, in real-time, said stationary valve actuation events and said traveling valve actuation events on said graphical format surface card.

21. The system of claim 17, further comprising:
a display, and wherein
said processor displays on said display, in real-time, said sequence of plunger position data points and said sequence of plunger load data points on a graphical format pump card, and wherein
said processor displays indicators of said a stationary valve actuation events and said traveling valve actuation events on said graphical format pump card.

22. The system of claim 17, further comprising:
a display, and wherein
said processor generates a graphical representation of the pump including the chamber and the plunger on said display, and wherein
said processor animates the movement of said plunger on said display according to said plunger position data points, and wherein
said processor generates a graphical representation of the stationary valve and the traveling valve on said graphical representation of the pump, and wherein
said processor animates movement of the stationary valve and the traveling valve on said display according to said a stationary valve actuation events and said traveling valve actuation events.

23. The system of claim 17, and wherein the well fluids have known physical properties, including a gas portion and a liquid portion, and wherein:
said processor calculates, in real-time, a sequence of pump chamber pressure data points according to said sequence of plunger load data points, and wherein
said processor determines a ratio of a gas portion to a liquid portion in the well fluids, and wherein
said processor calculates, in real-time, volumetric compression data points of said gas portion within the pump chamber, and wherein
said processor delivers, in real-time, said volumetric compression data points to a compression ratio data output.

24. The system of claim 23, and wherein:
said gas portion comprises hydrocarbon gas compounds, and
said liquid portion comprises a hydrocarbon liquid compounds portion and a water portion.

25. The system of claim 24, and wherein:
said processor calculates an effective plunger stroke factor by scaling said sequence of plunger position points with said volumetric compression data points, thereby resulting in the effective fluid displacement of the pump chamber.

26. The system of claim 25, further comprising:
a display, and wherein
said processor displays said effective plunger stroke factor in a graphical format on said display.

27. The system of claim 26, and wherein:
said processor calculates the pump liquid throughput in accordance with said effective plunger stroke factor, including proportions in accordance with said hydrocarbon liquid compounds portion and said water portion, and wherein said processor calculates the pump gas throughput in accordance with said volumetric compression data points of said gas portion.

28. The system of claim 25, further comprising:

a display, and wherein said processor generates a graphical representation of the pump on said display, including the chamber and the plunger, and wherein said processor animates the movement of the plunger on said display according to said plunger position data, and wherein said processor graphically represents said gas portion as a proportionally sized gas area on said display, and said processor graphically represents said hydrocarbon liquid compounds portion as a proportionally sized oil area within the camber of the pump on said display, and wherein said processor animates the movement of said gas portion and said hydrocarbon liquid compounds portion within the pump on said display.

29. The system of claim 28, and wherein:

said processor varies the size of said proportionally sized gas area in accordance with said volumetric compression data points on said display, thereby animating the compression of the said gas portion during cyclic operation of the pump.

* * * * *